(12) United States Patent
Zhang et al.

(10) Patent No.: US 10,814,287 B2
(45) Date of Patent: Oct. 27, 2020

(54) MULTILAYER ARTICLES INCLUDING COATINGS ON MICROFILTRATION MEMBRANE SUBSTRATES AND METHODS OF MAKING SAME

(71) Applicant: 3M INNOVATIVE PROPERTIES COMPANY, St. Paul, MN (US)

(72) Inventors: Chunjie Zhang, Shoreview, MN (US); Hongying Jiang, Woodbury, MN (US); Xuan Jiang, Shanghai (CN); Naiyong Jing, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 66 days.

(21) Appl. No.: 16/097,854

(22) PCT Filed: May 5, 2017

(86) PCT No.: PCT/US2017/031253
§ 371 (c)(1),
(2) Date: Oct. 31, 2018

(87) PCT Pub. No.: WO2017/196656
PCT Pub. Date: Nov. 16, 2017

(65) Prior Publication Data
US 2019/0143277 A1    May 16, 2019

Related U.S. Application Data

(60) Provisional application No. 62/336,007, filed on May 13, 2016.

(51) Int. Cl.
*B01D 69/12* (2006.01)
*B01J 20/28* (2006.01)
(Continued)

(52) U.S. Cl.
CPC ......... *B01D 69/12* (2013.01); *B01D 67/0079* (2013.01); *B01D 71/027* (2013.01);
(Continued)

(58) Field of Classification Search
CPC ........ B01D 69/12; B01D 67/00; B01D 71/02; B01D 61/14
See application file for complete search history.

(56) References Cited

U.S. PATENT DOCUMENTS

| | | |
|---|---|---|
| 4,338,194 A | 7/1982 | Tanny |
| 4,539,256 A | 9/1985 | Shipman |

(Continued)

FOREIGN PATENT DOCUMENTS

| | | |
|---|---|---|
| CN | 103861468 | 6/2014 |
| CN | 105561803 | 5/2016 |

(Continued)

OTHER PUBLICATIONS

Bragg, "The form birefringence of macromolecules", Acta Crystallographica, Nov. 1953, vol. 6, No. 11-12, pp. 865-867.
(Continued)

*Primary Examiner* — Ellen M McAvoy
(74) *Attorney, Agent, or Firm* — Adrian L. Pishko

(57) ABSTRACT

The present disclosure provides a multilayer article. The multilayer article includes a) a microfiltration membrane substrate; b) a first layer directly attached to the first major surface of the microfiltration membrane substrate; and c) a second layer directly attached to the first layer. The first layer includes a first polymeric binder and acid-sintered interconnected first silica nanoparticles arranged to form a continuous three-dimensional porous network. The second layer includes acid-sintered interconnected second silica nanoparticles arranged to form a continuous three-dimensional porous network. The present disclosure also provides a (Continued)

method for forming a multilayer article. The method includes (a) saturating a microfiltration membrane substrate with a liquid; (b) applying a first aqueous coating formulation to at least a portion of a first major surface of the microfiltration membrane substrate to form a coated substrate; (c) sintering the coated substrate, thereby forming a first layer; (d) applying a second aqueous coating formulation to the first major surface of the first layer to form a twice-coated substrate; and (e) sintering the twice-coated substrate.

16 Claims, 6 Drawing Sheets

(51) Int. Cl.
    *B01J 20/32* (2006.01)
    *B01D 67/00* (2006.01)
    *B01D 71/02* (2006.01)
    *B01J 20/10* (2006.01)
    B01D 71/56 (2006.01)
    B01D 71/68 (2006.01)

(52) U.S. Cl.
    CPC ......... *B01J 20/103* (2013.01); *B01J 20/2803* (2013.01); *B01J 20/28007* (2013.01); *B01J 20/28035* (2013.01); *B01J 20/3234* (2013.01); *B01J 20/3268* (2013.01); *B01J 20/3295* (2013.01); *B01D 71/56* (2013.01); *B01D 71/68* (2013.01)

(56) References Cited

U.S. PATENT DOCUMENTS

| | | |
|---|---|---|
| 4,567,221 A | 1/1986 | Maruyama |
| 4,726,989 A | 2/1988 | Mrozinski |
| 4,865,739 A | 9/1989 | Bauer |
| 5,120,594 A | 6/1992 | Mrozinski |
| 5,221,497 A | 6/1993 | Watanabe |
| 5,238,623 A | 8/1993 | Mrozinski |
| 5,993,954 A | 11/1999 | Radovanovic |
| 6,040,053 A | 3/2000 | Scholz |
| 6,632,850 B2 | 10/2003 | Hughes |
| 7,112,237 B2 | 9/2006 | Zeller |
| 7,329,311 B2 | 2/2008 | Zeller |
| 7,534,287 B2 | 5/2009 | Zeller |
| 7,723,424 B2 | 5/2010 | Hashemzadeh |
| 9,533,935 B2 | 1/2017 | Colby |
| 10,328,389 B2 * | 6/2019 | Jiang ................... B01D 61/145 |
| 2006/0194037 A1 | 8/2006 | Fink |
| 2010/0035039 A1 | 2/2010 | Jing |
| 2010/0056369 A1 | 3/2010 | Gu |
| 2010/0224555 A1 | 9/2010 | Hoek |
| 2011/0027599 A1 | 2/2011 | Hoek |
| 2011/0033694 A1 | 2/2011 | Jing |
| 2011/0139726 A1 | 6/2011 | Jin |
| 2011/0244013 A1 | 10/2011 | Mrozinski |
| 2013/0056420 A1 * | 3/2013 | Wang ..................... B01D 69/12 210/650 |
| 2013/0171416 A1 | 7/2013 | Diekmann |
| 2014/0322586 A1 | 10/2014 | Lee |
| 2015/0060364 A1 * | 3/2015 | McCutcheon ......... B01D 69/12 210/654 |
| 2016/0310907 A1 * | 10/2016 | Hanakawa ............. B01D 69/02 |
| 2017/0173535 A1 * | 6/2017 | Jiang ................... B01D 61/147 |
| 2020/0001249 A1 * | 1/2020 | Zhang ................ B01D 67/0079 |

FOREIGN PATENT DOCUMENTS

| | | |
|---|---|---|
| JP | 2002338229 | 11/2002 |
| WO | WO 2004-054625 | 7/2004 |
| WO | WO 2006-098872 | 9/2006 |
| WO | WO 2011-072196 | 6/2011 |
| WO | WO 2011-139573 | 11/2011 |
| WO | WO 2012-047422 | 4/2012 |
| WO | WO 2012-060917 | 5/2012 |
| WO | WO 2012-064646 | 5/2012 |
| WO | WO 2015-157119 | 10/2015 |
| WO | WO 2016-004381 | 1/2016 |

OTHER PUBLICATIONS

Elma, "Microporous Silica Based Membranes for Desalination", Water, Sep. 2012, vol. 4, No. 3, pp. 629-649.

Li, "Effects of thermal efficiency in DCMD and the preparation of membranes with low thermal conductivity", Applied Surface Science, 2014, vol. 317, pp. 338-349, XP29081096.

International Search Report for PCT International Application No. PCT/US2017/031253, dated Jul. 25, 2017, 5 pages.

* cited by examiner

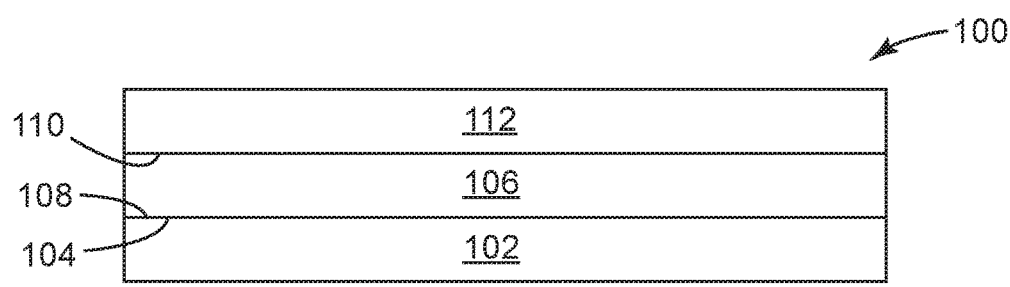
Fig. 1
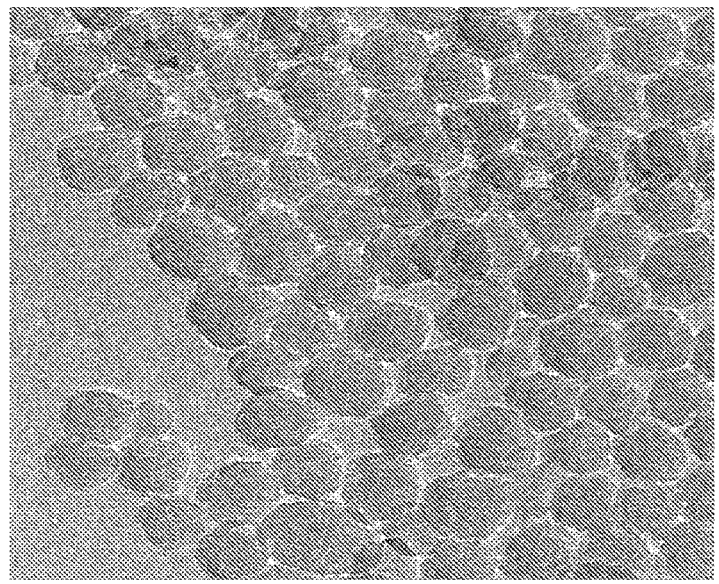
Fig. 2A  20nm
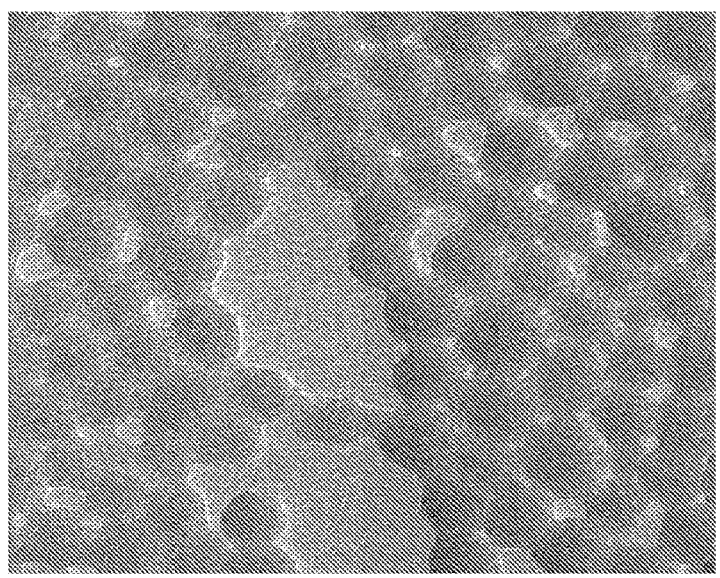
Fig. 2B  20nm

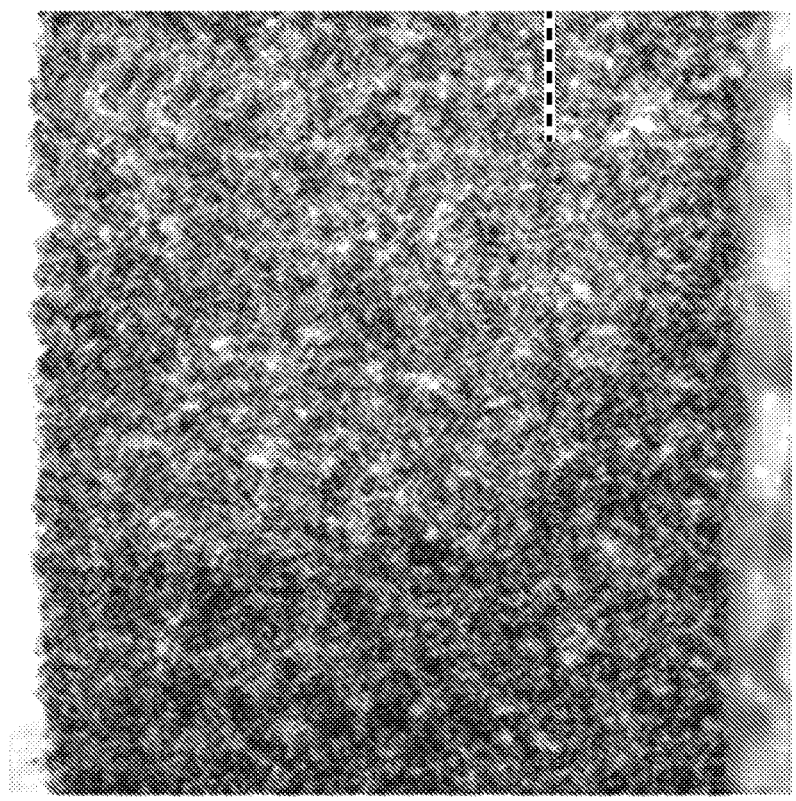
*Fig. 6A* 500nm
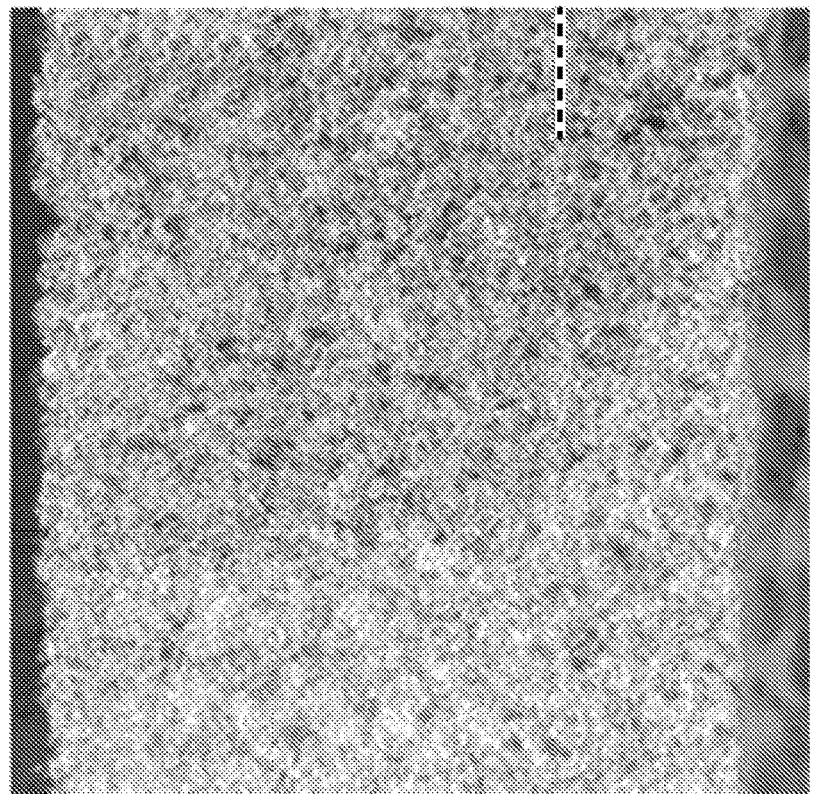
*Fig. 6B* 500nm

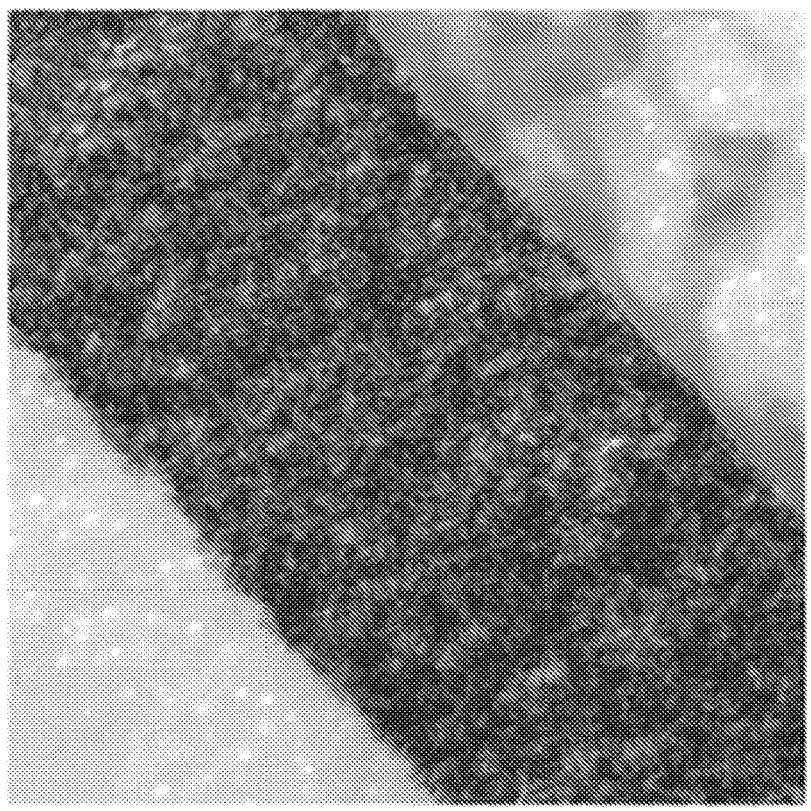
*Fig. 6C*  500nm
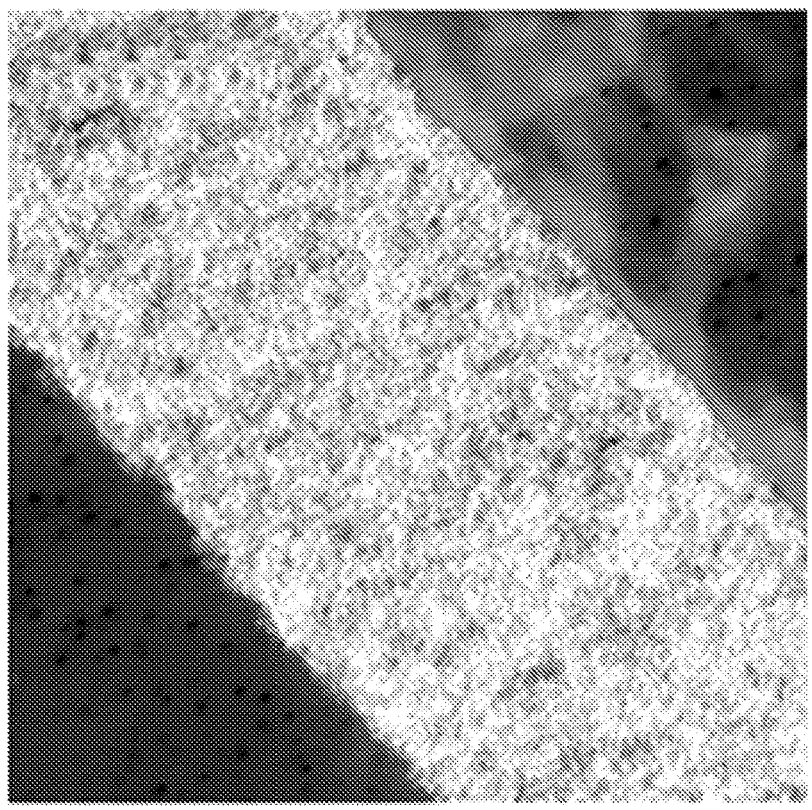
*Fig. 6D*  500nm

MULTILAYER ARTICLES INCLUDING COATINGS ON MICROFILTRATION MEMBRANE SUBSTRATES AND METHODS OF MAKING SAME

CROSS REFERENCE TO RELATED APPLICATIONS

This application is a national stage filing under 35 U.S.C. 371 of PCT/US2017/031253, filed May 5, 2017, which claims the benefit of U.S. Application No. 62/336,007, filed May 13, 2016, the disclosure of which is incorporated by reference in its/their entirety herein.

TECHNICAL FIELD

The present disclosure relates to porous multilayer articles and methods of making and using such materials. The multilayer articles are both microporous and nanoporous.

BACKGROUND

Microporous materials generally have pores with an effective diameter typically at least several times the mean free path of the molecules passing through them, namely from several micrometers down to as low as about 100 Angstroms (0.01 micrometers). Ultrafiltration membranes generally have pore sizes below 50 nm, and can be expensive to make due to the materials and processes typically employed. Ultrafiltration membranes are generally desired to have a high density of pores with a well-defined single pore size in the nanometer range. Such membranes are also expected to demonstrate both high permeability and high selectivity. However, a trade-off between permeability and selectivity commonly exists in current technologies.

Commercially available membranes often have limited performance primarily due to difficulties in controlling pore formation, which leads to a sparsely distributed pore size. Therefore, high permeability and high selectivity cannot readily be synchronized within the same membrane. Beyond technical challenges, high price is another prevalent hurdle for the broad application of such membranes.

SUMMARY

Briefly, the present disclosure describes exemplary embodiments of a multilayer article including both a microporous membrane and two coating layers on the microporous membrane. In some exemplary methods, these multilayer articles can be produced at relatively high rates and low cost. In certain exemplary embodiments, the microporous materials are used to produce multilayer articles with advantageous features arising from a combination of the microporous material and the multiple layers.

In a first aspect, a multilayer article is provided. The multilayer article includes a) a microfiltration membrane substrate, the microfiltration membrane substrate having a first major surface; and b) a first layer having a first major surface and a second major surface disposed opposite the first major surface. The first major surface of the first layer is directly attached to the first major surface of the microfiltration membrane substrate. The first layer comprises a first polymeric binder and a plurality of acid-sintered interconnected first silica nanoparticles arranged to form a continuous three-dimensional porous network. The multilayer article further includes c) a second layer directly attached to the second major surface of the first layer. The second layer comprises a plurality of acid-sintered interconnected second silica nanoparticles arranged to form a continuous three-dimensional porous network.

In a second aspect, a method for forming a multilayer article is provided. The method includes (a) saturating a microfiltration membrane substrate with a liquid, the microfiltration membrane substrate having a first major surface; (b) applying a first aqueous coating formulation to at least a portion of the first major surface of the microfiltration membrane substrate to form a coated substrate; and (c) sintering the coated substrate, thereby forming a first layer directly attached to the first major surface of the microfiltration membrane substrate, the first layer having a first major surface. The first aqueous coating formulation comprises water, a first polymeric binder, a first acid, and a plurality of first silica nanoparticles. The method further includes (d) applying a second aqueous coating formulation to the first major surface of the first layer to form a twice-coated substrate, the second aqueous coating formulation comprising water, a second acid, and a plurality of second silica nanoparticles; and (e) sintering the twice-coated substrate, thereby forming the multilayer article, the multilayer article comprising a second layer directly attached to the first major surface of the first layer. The second aqueous coating formulation comprises water, a second acid, and a plurality of second silica nanoparticles.

BRIEF DESCRIPTION OF DRAWINGS

FIG. 1 is a schematic cross-sectional view of an exemplary multilayer article.

FIG. 2A is a transmission electron micrograph of a comparative example silica layer formed without acid-sintering of the silica nanoparticles.

FIG. 2B is a transmission electron micrograph of an exemplary silica layer formed using acid-sintered silica nanoparticles.

FIG. 6A is a scanning transmission electron microscope (STEM) bright field image of a cross-sectional view of the Example 11 multilayer article.

FIG. 6B is a STEM high angle annular dark field image of a cross-sectional view of the Example 11 multilayer article.

FIG. 6C is a STEM bright field image of a cross-sectional view of the Example 12 multilayer article.

FIG. 6D is a STEM high angle annular dark field image of a cross-sectional view of the Example 12 multilayer article.

Figure 3:
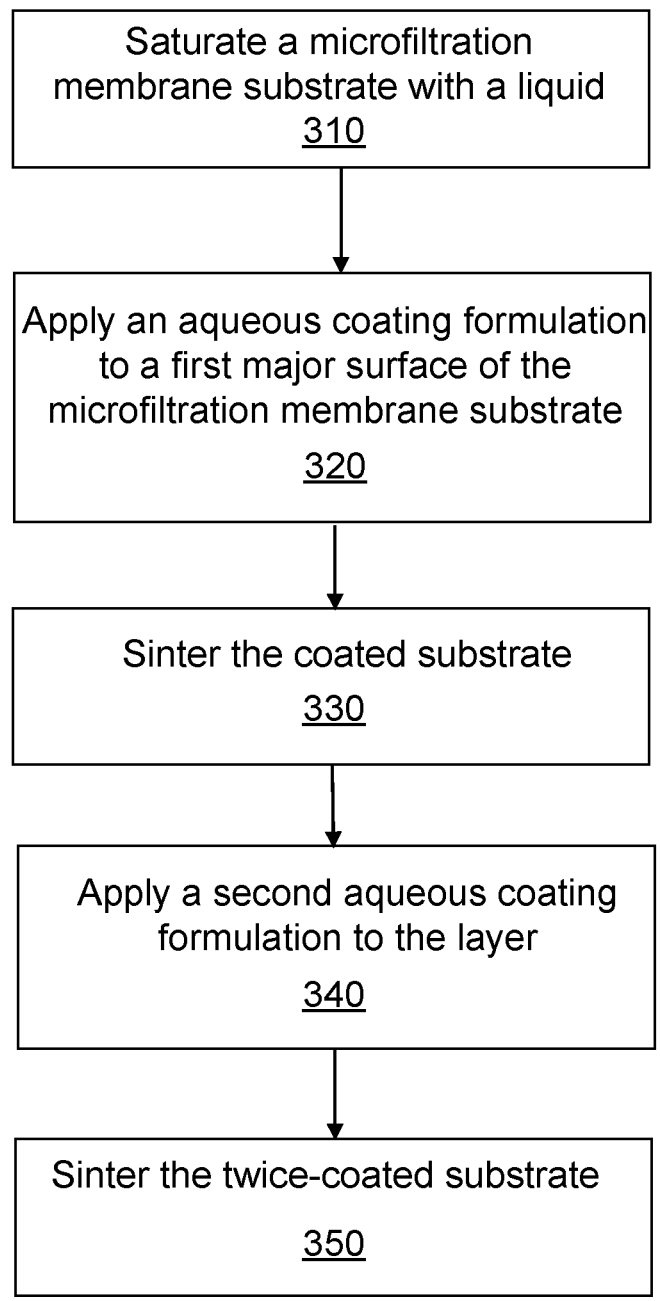
FIG. 3 is a flow chart of an exemplary method.

While the above-identified drawings, which may not be drawn to scale, set forth various embodiments of the present disclosure, other embodiments are also contemplated, as noted in the Detailed Description. In all cases, this disclosure describes the presently disclosed disclosure by way of representation of exemplary embodiments and not by express limitations.

DETAILED DESCRIPTION

Various exemplary embodiments of the disclosure will now be described, with particular reference to the Examples and the Figures. Exemplary embodiments of the disclosure may take on various modifications and alterations without departing from the spirit and scope of the disclosure. Accordingly, it is to be understood that the embodiments of the disclosure are not to be limited to the following described exemplary embodiments, but is to be controlled by the limitations set forth in the claims and any equivalents thereof.

As used throughout this specification and the appended embodiments, the words "suitable" and "preferably" refer to embodiments of the disclosure that may afford certain benefits under certain circumstances. Other embodiments may also be suitable, however, under the same or other circumstances. Furthermore, the recitation of one or more suitable embodiments does not imply that other embodiments are not useful, and is not intended to exclude other embodiments from the scope of the disclosure.

For the following Glossary of defined terms, these definitions shall be applied for the entire application, including the claims:

Glossary

The term "(co)polymer" is used herein to refer to a homo(co)polymer or a (co)polymer.

The term "microporous" is used herein to mean a material comprising a network of interconnected pores having a median diameter less than one micrometer.

The term "acid-sintered silica nanoparticles" means silica nanoparticles that have been subjected to an acid having a pKa less than 3.5, such that a dispersion of the silica nanoparticles has a pH in a range of 2 to 5. Typically, thermal sintering of silica requires temperatures of about 70% of the melting point temperature of about 1400-1700° C.; however, the acid-sintered silica nanoparticles are instead chemically sintered by the acid. Optionally, the acid-sintered silica nanoparticles are also exposed to temperatures as high as about 250° C. during drying/curing process for the article. In contrast, silica nanoparticle sols that are merely acid-stabilized do not form acid-sintered silica nanoparticles upon drying/curing of the article.

The term "aqueous" with respect to a composition refers to the liquid carrier (e.g., solvent) of the composition comprising at least 50 weight percent water.

The term "hydrolyzable group" refers to a group that can react with water having a pH of 1 to 10 under conditions of atmospheric pressure. The hydrolyzable group is often converted to a hydroxyl group when it reacts. The hydroxyl group often undergoes further reactions. Typical hydrolyzable groups include, but are not limited to, alkoxy, aryloxy, aralkyloxy, acyloxy, or halo.

The term "alkoxy" refers to refers to a monovalent group having an oxy group bonded directly to an alkyl group.

The term "aryloxy" refers to a monovalent group having an oxy group bonded directly to an aryl group.

The term "aralkyloxy" refers to a monovalent group having an oxy group bonded directly to an aralkyl group. Equivalently, it can be considered to be an alkoxy group substituted with an aryl group.

The term "acyloxy" refers to a monovalent group of formula —O(CO)Rb where Rb is alkyl, aryl, or aralkyl. Suitable alkyl Rb groups often have 1 to 10 carbon atoms, 1 to 6 carbon atoms, or 1 to 4 carbon atoms. Suitable aryl Rb groups often have 6 to 12 carbon atoms such as, for example, phenyl. Suitable aralkyl Rb groups often have an alkyl group with 1 to 10 carbon atoms, 1 to 6 carbon atoms, or 1 to 4 carbon atoms that is substituted with an aryl having 6 to 12 carbon atoms such as, for example, phenyl.

The term "halo" refers to a halogen atom such as fluoro, bromo, iodo, or chloro.

The term "PVA" refers to poly(vinyl alcohol), derivatives thereof, and mixtures of poly(vinyl alcohol) and its derivatives. The degree of hydrolysis of PVA or its derivatives is from 50 to 100 percent, or 70 to 100 percent, or 85 to 100 percent. For example, the PVA can include up to 50 percent polyvinyl acetate.

The term "TIPS" refers to Thermally Induced Phase Separation.

The term "wt %" is used in accordance with its conventional industry meaning and refers to an amount based upon the total weight of solids in the referenced composition.

A number of methods for making microporous films and membranes are taught in the art. One of the most useful methods involves thermally induced phase separation. Generally such a process is based on the use of a polymer or (co)polymer that is soluble in a diluent at an elevated temperature but that is insoluble in the diluent material at a relatively lower temperature. Examples of such methods are described in U.S. Pat. Nos. 4,539,256, 4,726,989, and 5,120,594; and U.S. Application Publication No. 2011/0244013.

Articles described herein were developed and found useful for the creation of multilayer articles having an average pore size of less than 50 nanometers at one surface, including a microfiltration membrane as a substrate. The articles include acid catalyzed low temperature sintered bonded nanosilica and a reactive binder polymer to provide the small average pore size.

As disclosed above, in a first aspect a multilayer article is provided. The multilayer article comprises a) a microfiltration membrane substrate, the microfiltration membrane substrate having a first major surface; b) a first layer having a first major surface and a second major surface disposed opposite the first major surface, wherein the first major surface of the first layer is directly attached to the first major surface of the microfiltration membrane substrate, the first layer comprising a first polymeric binder and a plurality of acid-sintered interconnected first silica nanoparticles arranged to form a continuous three-dimensional porous network; and c) a second layer directly attached to the second major surface of the first layer, the second layer comprising a plurality of acid-sintered interconnected second silica nanoparticles arranged to form a continuous three-dimensional porous network.

Referring to FIG. 1, the multilayer article 100 includes a) a microfiltration membrane substrate 102, the microfiltration membrane substrate 102 having a first major surface 104; and b) a first layer 106 having a first major surface 108 and a second major surface 110 disposed opposite the first major surface 108. The first major surface 108 of the first layer 106 is directly attached to the first major surface 104 of the microfiltration membrane substrate 102. The first layer 106 comprises a first polymeric binder and a plurality of acid-sintered interconnected first silica nanoparticles arranged to form a continuous three-dimensional porous network. The multilayer article 100 further includes c) a second layer 112 directly attached to the second major surface 110 of the first layer 106. The second layer 112 comprises a plurality of acid-sintered interconnected second silica nanoparticles arranged to form a continuous three-dimensional porous network.

It has been discovered that it is possible to prepare an article (e.g., an ultrafiltration article, battery separator, etc.) that exhibits selectivity by forming two layers that each include a continuous three-dimensional porous network of acid-sintered interconnected silica nanoparticles including a polymeric binder. The two layers are supported by a microporous material. It was unexpectedly found that the use of two separate layers (even when the two layers are formed from identical compositions) provides greater selectivity than a single layer. For instance, exemplary multilayer articles according to certain embodiments of the present disclosure can selectively remove nanoparticles having an average diameter of 20 nanometers from a fluid sample, and/or can selectively reduce the amount of a bacteriophage (or other virus) in a fluid sample by at least a factor of 10, at least a factor of 100, at least a factor of 1,000, or even at least a factor of 10,000. In at least certain embodiments, exemplary multilayer articles can selectively reduce the amount of a bacteriophage (or other virus) in a fluid sample by at least a factor of 10 more, or 100 more, than can be removed by an article having a single layer of the same continuous three-dimensional porous network of acid-sintered interconnected silica nanoparticles including a polymeric binder instead of two layers.

Acid-sintered nanosilica coatings have been prepared by acidifying an aqueous colloidal suspension of nanometer-scale particles to a pH of less than 5, for example 2-3. Such silica nanoparticle coatings include those, for example, described in co-owned U.S. Patent Application Publication Nos. 2011/0033694 (Jing et al.) and 2010/0035039 (Jing et al.) and in co-owned International Application Publication Nos. WO 2012/064646 (Riddle et al.), WO 2011/139573 (Pett et al.), and WO 2012/047422 (Hebrink et al.). At a pH of 2-3, the particles possess little or no net charge, and can thus aggregate and fuse. Upon drying, the particles sinter at temperatures much lower than would be required without acidification.

The term "nanoparticle" refers to particles (e.g., silica particles) that are submicron in size. The nanoparticles have an average particle size, which typically refers to the average longest dimension of the particles, that is no greater than 500 nanometers, no greater than 200 nanometers, no greater than 100 nanometers, no greater than 75 nanometers, no greater than 50 nanometers, no greater than 40 nanometers, no greater than 25 nanometers, or no greater than 20 nanometers. The average particle size is often determined using transmission electron microscopy but various light scattering methods can be used as well. The average particle size refers to the average particle size of the primary silica nanoparticles used to form the silica network. The average particle size typically refers to the average size of non-agglomerated and/or non-aggregated and/or non-sintered single nanoparticles of silica. That is, the average particle size refers to the average particle size of the primary silica nanoparticles prior to sintering under acidic conditions.

Multiple silica nanoparticles are joined together into a three dimensional network by low temperature (e.g., at or near room temperature) sintering in the presence of an acid (i.e., chemical sintering). The silica nanoparticles in the article are acid-sintered. At least some adjacent nanoparticles in the porous network tend to have bonds such as silica "necks" joining them together (see, e.g., FIG. 2B). These silica necks are typically formed by acidification of the silica nanoparticles, and are attributed to the catalytic action of strong acid in making and breaking siloxane bonds. Stated differently, at least some adjacent silica nanoparticles tend to be joined together forming a three dimensional porous network. The term "network" refers to a continuous three-dimensional structure formed by linking together silica nanoparticles. The term "continuous" means that the individual silica nanoparticles are linked over the dimension of the layer coating. The term "agglomerated" refers to multiple bonding between the silica particles which have many points of contact with one or another. As result of the necking, bonding or entanglements of the silica particles, the original particle shapes may be deformed. Transmission electron microscopy generally reveals that at least 25%, preferably at least 50% of the silica particles in the resultant coatings are bonded to adjacent particles. Mineral acids may be preferred, for instance to minimize steric hindrance that could be caused by the structure of an organic acid located between two adjacent silica nanoparticles.

FIG. 2A is a transmission electron micrograph of a layer of silica nanoparticles from ethanol at a basic pH. The layer is non-uniform and the individual particles are not linked to the adjacent particles. In contrast to FIG. 2A, FIG. 2B is a transmission electron micrograph of acid-sintered silica nanoparticles. Unlike chains of fumed silica particles that are simply linear chains of sintered silica nanoparticles, the acid-sintered layer is a continuous network of chemically sintered interconnected nanoparticles that can be arranged to form a three-dimensional layer. The linear chains of fumed silica are not connected together and typically form a layer by combination with a binder such as a polymeric binder. A majority of the polymeric binder (and any organic materials present in the continuous network) described herein is simply located within various pores (e.g., voids) of the interconnected network, although a minority of the polymeric binder present optionally holds some portions of the layer together. Further, chains of fumed silica particles are formed at relatively high temperatures such as at temperatures greater than 300° C., greater than 400° C., or greater than 500° C. In contrast, the acid-sintered network is formed by sintering the silica nanoparticles at relatively low temperatures such as at or near room temperature (e.g., 20-25° C.) in the presence of an acid.

The term "porous" refers to the presence of voids between the individual silica nanoparticles within the continuous silica network. Porosity may be calculated from the refractive index of the coating according to published procedures such as in W. L. Bragg, A. B. Pippard, *Acta Crystallographica*, volume 6, page 865 (1953). Porosity tends to correlate to the roughness of the surface. The porosity tends to also correlate with the hydrophilicity of the surface. That is, increased surface roughness tends to lead to increased hydrophilicity. Porosity of the surface can often be increased by using silica nanoparticles with a larger average particle size or by using a mixture of silica nanoparticles with different shapes.

Not wishing to be bound by theory, it is believed that the agglomerates of the silica nanoparticles are formed by through acid-catalyzed siloxane bonding in combination with protonated silanol groups at the particle surfaces and these agglomerates explain the coatability on hydrophobic organic surfaces, as these groups tend to be bonded, adsorbed, or otherwise durably attached to hydrophobic surfaces. Although aqueous organic solvent-based coatings of nanoparticle silica dispersions have been described, such mixtures of water and an organic solvents may suffer from differential evaporation rates that result in continuously changing composition of the liquid phase, which consequently changes the coating properties; resulting in poor uniformity and defects.

The larger the silica particles, the smaller the contact point between adjacent silica particles during formation of neck bonding, thus the larger the pores between the adjacent silica particles. Concomitantly, the smaller the particles, the larger the contact point between adjacent silica particles during formation of neck bonding, thus the smaller the pores between the adjacent silica particles. Selecting particular silica particle sizes of unimodal and/or multimodal distributions is thus one factor in the formation of a controlled pore size silica network.

The primary silica nanoparticles used to prepare acid-sintered silica networks can have any desired shape or mixture of shapes. The silica nanoparticles can be spherical or non-spherical (i.e., acicular) with any desired aspect ratio. Aspect ratio refers to the ratio of the average longest dimension of the nanoparticles to the average shortest dimension of acicular silica nanoparticles. The aspect ratio of acicular silica nanoparticles is often at least 2:1, at least 3:1, at least 5:1, or at least 10:1. Some acicular nanoparticles are in the shape of rods, ellipsoids, needles, and the like. The shape of the nanoparticles can be regular or irregular. The porosity of the coatings can be varied by changing the amount of regular and irregular shaped nanoparticles in the composition and/or by changing the amount of spherical and acicular nanoparticles in the composition.

If the silica nanoparticles are spherical, the average diameter is often up to 500 nanometers, less than 200 nanometers, less than 100 nanometers, less than 50 nanometers, less than 40 nanometers, less than 25 nanometers, or less than 20 nanometers, or up to 20 nanometers. Some nanoparticles can have an even smaller average diameter such as less than 10 nanometers or less than 5 nanometers.

If the silica nanoparticles are acicular, they often have an average width (smallest dimension) equal to at least 1 nanometer, at least 2 nanometers, or at least 5 nanometers. The average width of acicular silica nanoparticles is often no greater than 25 nanometers, no greater than 20 nanometers, or no greater than 10 nanometers. The acicular silica nanoparticles can have an average length $D_1$ measured by dynamic light scattering methods that is, for example, at least 40 nanometers, at least 50 nanometers, at least 75 nanometers, or at least 100 nanometers. The average length $D_1$ (e.g., longer dimension) can be up to 200 nanometers, up to 400 nanometers, or up to 500 nanometers. The acicular colloidal silica particles may have degree of elongation $D_1/D_2$ in a range of 5 to 30, wherein $D_2$ means a diameter in nanometers calculated by the equation $D_2=2720/S$ and S means specific surface area in meters squared per gram (m²/gram) of the nanoparticle, as described in U.S. Pat. No. 5,221,497 (Watanabe et al.).

In certain embodiments, each of the first silica nanoparticles and the second silica nanoparticles independently have an average particle size (i.e., longest dimension) that less than or equal to 500 nanometers, less than or equal to 300 nanometers, less than or equal to 250 nanometers, less than or equal to 200 nanometers, less than or equal to 100 nanometers, greater than 2 nanometers, greater than 5 nanometers, greater than 10 nanometers, greater than 25 nanometers, or greater than 50 nanometers (e.g., in the range of 2 nanometers to 250 nanometers or 100 nanometers to 250 nanometers). Various sizes and/or various shapes of particles may be used in combination.

In certain embodiments, multimodal distributions of particle sizes may be used in one or both of the first silica nanoparticles and the second silica nanoparticles. For example, nanoparticles having an average particle size of at least 100 nanometers (e.g., in the range of 110 to 250 nanometers or in the range of 100 to 150 nanometers, inclusive) can be used in combination with nanoparticles having an average diameter no greater than 90 nanometers (e.g., in the range of 1 to 90 nanometers, 5 to 90 nanometers, or 15 to 90 nanometers, inclusive). The weight ratio of the larger to smaller nanoparticles can be in the range of 2:98 to 98:2, in the range of 5:95 to 95:5, in the range of 10:90 to 90:10, or in the range of 20:80 to 80:20. For instance, in certain embodiments the first distribution of the first silica nanoparticles comprises average particle size diameters of 100 nm to 250 nm, inclusive, and the second distribution of the first silica nanoparticles comprises average particle size diameters of 1 nm to 90 nm, inclusive. In at least certain embodiments according to the present disclosure, use of different sizes of silica nanoparticles can result in achieving a smaller pore size through the networks.

Coating dispersions (e.g., aqueous coating formulations) having a bimodal distribution of silica nanoparticles (e.g., the first silica nanoparticles and/or the second silica nanoparticles) can include 0.1 to 50 weight percent silica nanoparticles having an average particle size of 90 nanometers or less and 0 to 50 weight percent silica nanoparticles having an average particle size of 100 nanometers or greater. The amount is based on a total weight of the aqueous coating formulation to be applied to a microporous substrate. The silica nanoparticle sizes are selected to provide a controlled pore size of the silica network, as discussed further in the Examples below.

In certain embodiments, the first silica nanoparticles and the second silica nanoparticles comprise the same average particle size diameters, whereas in other embodiments the first silica nanoparticles and the second silica nanoparticles comprise at least some average particle size diameters that are different from each other.

Generally, the total weight of silica nanoparticles (regardless of size) in a silica coating dispersion (e.g., aqueous coating formulation) is at least 0.1 weight percent based on the total weight of the coating dispersion. For example, a silica coating dispersion can include at least 1 weight percent, at least 2 weight percent, or at least 5 weight percent silica nanoparticles. A silica coating dispersion often contains up to 100 weight percent, up to 80 weight percent, up to 60 weight percent, up to 40 weight percent, up to 30 weight percent up to 20 weight percent, or up to 10 weight percent silica nanoparticles. The amount of silica nanoparticles in the silica coating dispersion can be, for example, in the range of 0.1 to 100 weight percent, in the range of 1 to 80 weight percent, in the range of 1 to 50 weight percent, in the range of 1 to 30 weight percent, in the range of 5 to 20 weight percent, in the range of 1 to 10 weight percent, in the range of 5 to 10 weight percent, or in the range of 1 to 7 weight percent.

The silica nanoparticles are typically commercially available in the form of a silica sol, and the silica nanoparticles may be pyrogenic silica or amorphous silica. Some example spherical silica nanoparticles are available in the form of aqueous-based silica sols such as those commercially available under the trade designation LUDOX (e.g., LUDOX SM) from E.I. DuPont de Nemours and Co., Inc. (Wilmington, Del.). Other example aqueous-based silica sols are commercially available under the trade designation NYACOL from Nyacol Co. (Ashland, Mass.). Additional example aqueous-based silica sols are commercially available under the trade designation ECS SI-4530 from Evonik Industries (Parsippany, N.J.). Still other example aqueous-based silica sols are commercially available under the trade designation NALCO (e.g., NALCO 1115, NALCO 2326, NALCO 2327, NALCO 2329, NALCO DVSNZ004, and NALCO 1130) from Ondea Nalco Chemical Co. (Oak Brook, Ill.). Yet other example aqueous-based silica sols are commercially available under the trade designation REMASOL (e.g., REMASOL SP30) from Remet Corporation (Utica, N.Y.) and under the trade designation SILCO (e.g., SILCO LI-518) from Silco International (Portland, Oreg.). Further suitable spherical silica nanoparticles may be obtained in the form of aqueous-based silica sols under the trade designation SNOWTEX from Nissan Chemical Industries (Tokyo, Japan).

Suitable non-spherical (i.e., acicular) silica nanoparticles may be obtained in the form of aqueous-based silica sols under the trade designation SNOWTEX from Nissan Chemical Industries (Tokyo, Japan). For example, SNOWTEX-UP contains silica nanoparticles having a diameter in the range of about 9 to 15 nanometers with lengths in a range of 40 to 300 nanometers. SNOWTEX-PS-S and SNOWTEX-PS-M have a chain of beads morphology. The SNOWTEX-PS-M particles are about 18 to 25 nanometers in diameter and have lengths of 80 to 150 nanometers. The SNOWTEX-PS-S has a particle diameter of 10-15 nm and a length of 80-120 nanometers.

Suitable pyrogenic (i.e., fumed) amorphous silica nanoparticles may be obtained in the form of aqueous-based dispersions under the trade designation CAB-O-SPERSE (e.g, CAB-O-SPERSE 2012A, CAB-O-SPERSE 2017A, CAB-O-SPERSE 2020K, and CAB-O-SPERSE 4012K), from Cabot Corporation (Tuscola, Ill.).

Either water or a water-miscible organic solvent can be used to dilute commercially available aqueous-based silica sols.

The silica coating dispersion (e.g., aqueous coating formulation) contains an acid having a pKa ($H_2O$) that is less than or equal to 3.5. The use of weaker acids such as those having a pKa greater than 4 (e.g., acetic acid) typically does not result a uniform coating (i.e., layer) having desirable transmissivity and/or durability. In particular, coating dispersions with weaker acids such as acetic acid typically bead up on the surface of a substrate. The pKa of the acid added to the coating dispersion is often less than 3, less than 2.5, less than 2, less than 1.5, or less than 1. Useful acids that can be used to adjust the pH of the silica coating dispersion include both organic and inorganic acids. Example acids include, but are not limited to, oxalic acid, citric acid, $H_2SO_3$, $H_3PO_4$, $CF_3CO_2H$, HCl, HBr, HI, $HBrO_3$, $HNO_3$, $HClO_4$, $H_2SO_4$, $CH_3SO_3H$, $CF_3SO_3H$, $CF_3CO_2H$, and $CH_3SO_2OH$. In many embodiments, the acid is HCl, $HNO_3$, $H_2SO_4$, or $H_3PO_4$. Without wishing to be bound by theory, it is believed that some of the silica in contact with acid undergoes a condensation reaction in which silicon dioxide is reacted with acid to form a silicic acid. The silicic acid is capable of forming a continuous three-dimensional porous network of interconnected acid-sintered silica nanoparticles upon drying of the acidified silica coating dispersion. In some embodiments, it is desirable to provide a mixture of an organic and inorganic acid. If commercially available acidic silica sols are used, the addition of one of the acids listed above typically result in silica networks having the desired uniformity.

The silica coating dispersion (e.g., aqueous coating formulation) generally contains sufficient acid to provide a pH no greater than 5. The pH is often no greater than 4.5, no greater than 4, no greater than 3.5, or no greater than 3. For example, the pH is often in the range of 2 to 5. In some embodiments, the silica coating dispersion can be adjusted to a pH in the range of 5 to 6 after first reducing the pH to less than 5. This pH adjustment can allow the coating of pH sensitive substrates. The acid-sintered silica nanoparticles appear to be stable when the pH is in the range 2 to 4. Light-scattering measurements have demonstrated that the acidified silica nanoparticles at pH in the range of 2 to 3 and at a concentration of 10 weight percent silica nanoparticles can retain the same size for more than a week or even more than a month. Such acidified silica coating dispersions are expected to remain stable even longer if the concentration of silica nanoparticles is lower than 10 weight percent.

Silica coating dispersions (e.g., aqueous coating formulations) typically further include water or a mixture of water plus a water-miscible organic solvent. Suitable water-miscible organic solvents include, but are not limited to, various alcohols (e.g., ethanol or isopropanol) and glycols (e.g., propylene glycol), ethers (e.g., propylene glycol methyl ether), ketones (e.g., acetone), and esters (e.g., propylene glycol monomethyl ether acetate). The silica nanoparticles included in the silica coating dispersions typically are not surface modified.

As applied to a substrate surface or another silica coating layer, a silica coating dispersion (e.g., aqueous coating formulation) is a sol. After the silica coating dispersion is applied to the substrate or other layer, a gelled material forms as the sol dries and the silica nanoparticles sinter to form the continuous network.

The typical average dry coating thickness of the first layer and the second layer in combination (e.g., the thickness of the first layer plus the thickness of the second layer) is in the range of 0.1 micrometers (μm) to 10.0 μm, 0.5 μm to 10.0 μm, or 0.5 μm to 5.0 μm, or 1.0 μm to 4.0 μm, inclusive. Each silica layer typically contains at least 50 weight percent, at least 60 weight percent, at least 70 weight percent, at least 80 weight percent, at least 85 weight percent silica nanoparticles, based on a total weight of the dried silica network. Each (dried) silica network can independently contain up to 90 weight percent, up to 95 weight percent, or up to 99 percent or higher silica nanoparticles based on the total weight of the dried silica network. For example, each dried silica network can independently contain 50 to greater than 99 weight percent, 50 to 95 weight percent, 50 to 90 weight percent, 50 to 99 weight percent, 75 to 99 percent, 75 to 95 weight percent, 80 to 99 weight percent, or 85 to 95 weight percent silica nanoparticles, inclusive. Likewise, each dried silica network can independently contain 1 to 50 weight percent, 1 to 40 weight percent, 5 to 50 weight percent, 10 to 50 weight percent, or 10 to 30 weight percent polymer binder, inclusive.

The first layer includes a polymeric binder, and in certain embodiments the second layer also includes a polymeric binder. A polymeric binder assists in providing elasticity to the continuous three-dimensional porous network of acid-sintered interconnected silica nanoparticles of a layer, which results in greater resistance to damage (e.g., cracking) to the network during preparation, handling, and use of the article. Moreover, the polymeric binder typically adds viscosity to the dispersion (e.g., aqueous coating formulation) to assist in coating the dispersion on the microfiltration membrane. A weight ratio of the silica nanoparticles to the polymer binder in each of the first layer and the second layer is in a range from 90:10 to 70:30, inclusive. Suitable polymeric binders include at least one hydroxyl group or hydrolyzable group that can react with the acid-sintered silica nanoparticles. When a polymeric binder is included in each of the first layer and the second layer, the first polymeric binder and the second polymeric binder can be either the same or different, such as independently selected from poly(vinyl alcohol) (PVA), a polysaccharide, a urethane resin, and an acrylate resin.

In certain embodiments, the polymeric binder comprises poly(vinyl alcohol) (PVA). PVA is a polymer that is known and available commercially. Typically, PVA is prepared by hydrolyzing acetate groups to hydroxyl groups. PVA, silane-modified PVA, and combinations thereof, are employed in certain embodiments of multilayer coatings of the present invention. Silane-modified PVA is believed to provide improved strength to the PVA and/or to enhance adhesion of the PVA to the silica nanoparticles. Suitable silane-modified polyvinyl alcohols include those known in the art, such as silane-modified PVA produced via treating vinyl alcohol polymers with one or more ethylenically unsaturated, silane-containing monomers at elevated temperature. See, for example, U.S. Pat. No. 7,723,424 (Hashemzadeh et al.). Alternatively, U.S. Pat. No. 4,567,221 (Maruyama et al.) discloses synthesizing a silylated PVA by copolymerizing vinyl acetate and vinyl alkoxy silanes, subsequently followed by hydrolyzing the acetate groups. Any suitable PVA may be employed, for example KURARAY R-2105, which is a trade designation for a silane modified polyvinyl alcohol polymer commercially available from Kuraray Co. LTD, Japan. Another suitable PVA is KURARAY PVA 235, which is a trade designation for a polyvinyl alcohol polymer that is also commercially available from Kuraray Co. LTD, Japan. In some embodiments the PVA is partially hydrolyzed, whereas in other embodiments the PVA is fully hydrolyzed.

Generally, the total weight of PVA in the silica coating dispersion (e.g., aqueous coating formulation) is at least 0.1 weight percent based on the total weight of the coating dispersion. A silica coating dispersion often contains up to 50 weight percent, up to 30 weight percent, up to 20 weight percent or up to 10 weight percent PVA. For example, a silica coating dispersion can include at least 1 weight percent, at least 2 weight percent, or at least 5 weight percent PVA.

In certain embodiments, the polymeric binder comprises a polysaccharide (e.g, a carbohydrate containing more than three monosaccharide units per molecule). Some suitable polysaccharides include for example dextran, cellulose, chitin, and chitosan. Dextran, for instance, is a polymer that is known and available commercially. More particularly, dextran is a water-soluble polysaccharide of glucose produced by the fermentation of *Leuconostoc mesenteroides* on sucrose. It is preferred that the molecular weight of the dextran be greater than about 5,000 grams per mole and more preferred that the molecular weight is greater than about 40,000 grams per mole, such as 100,000 grams per mole or 249,000 grams per mole.

Cellulose derivatives are also suitable polysaccharides, containing repeated glucose units bonded together by beta-linkages. Suitable cellulose derivatives include for instance and without limitation hydroxyethyl cellulose, hydroxypropyl cellulose, hydroxypropyl methylcellulose, copolymers of hydroxyethyl cellulose and diallyldimethyl ammonium chloride, and derivatives and combinations thereof.

Chitin is another suitable polysaccharide, containing N-acetylglucosamine units, which form covalent beta-1,4 linkages. Chitin is commercially available and produced by fungi, arthropods and nematodes. Chitosan, a derivative of chitin, is yet another suitable polysaccharide. Chitosan contains randomly distributed beta-(1-4)-linked D-glucosamine and N-acetyl-D-glucosamine.

Generally, the total weight of a polysaccharide (e.g., dextran, cellulose derivative, chitin, chitosan, etc.) in a silica coating dispersion (e.g., aqueous coating formulation) is at least 0.1 weight percent based on the total weight of the coating dispersion. A silica coating dispersion often contains up to 50 weight percent, up to 30 weight percent, up to 20 weight percent or up to 10 weight percent polysaccharide. For example, a silica coating dispersion can include at least 1 weight percent, at least 2 weight percent, or at least 5 weight percent polysaccharide.

In certain embodiments, the polymeric binder comprises a urethane resin. Suitable urethane resins include polymers made from the reaction product of a compound containing at least two isocyanate groups (—N═C═O), referred to herein as "isocyanates", and a compound containing at least two active-hydrogen containing groups. Examples of active-hydrogen containing groups include primary alcohols, secondary alcohols, phenols and water. Other active-hydrogen containing groups include primary and secondary amines which react with the isocyanate to form a urea linkage, thereby making a polyurea. A wide variety of isocyanate-terminated materials and appropriate co-reactants are well known, and many are commercially available (see, for example, Gunter Oertel, "Polyurethane Handbook", Hanser Publishers, Munich (1985)).

Generally, the total weight of urethane in a silica coating dispersion (e.g., aqueous coating formulation) is at least 0.1 weight percent based on the total weight of the coating dispersion. A silica coating dispersion often contains up to 50 weight percent, up to 30 weight percent, up to 20 weight percent or up to 10 weight percent urethane. For example, a silica coating dispersion can include at least 1 weight percent, at least 2 weight percent, or at least 5 weight percent urethane.

In certain embodiments, the polymeric binder comprises an acrylate resin. Suitable acrylate resins include, e.g., acrylates and methacrylates, vinyl acrylates, acrylated epoxies, acrylated urethanes, acrylated polyesters, acrylated acrylics, acrylated polyethers, vinyl ethers, acrylated oils and acrylated silicones. Suitable acrylates include methyl methacrylate, methacrylic acid, tetrahydrofurfuryl methacrylate, isobornyl acrylate, and isobornyl methacrylate. Multifunctional (meth)acrylic acid esters can optionally be included as crosslinking agents. These multifunctional (meth)acrylates can include, but are not limited to, ethylene glycol dimethacrylate, 1,6-hexanediol dimethacrylate, 1,6-hexanediol diacrylate, trimethylolpropane triacrylate, pentaerythritol tetraacrylate, 1,2-ethylene glycol diacrylate, the dimethacrylate of ethylene oxide modified bisphenol A and the diacrylate of ethylene oxide modified bisphenol A.

Generally, the total weight of acrylate in a silica coating dispersion (e.g., aqueous coating formulation) is at least 0.1 weight percent based on the total weight of the coating dispersion. A silica coating dispersion often contains up to 50 weight percent, up to 30 weight percent, up to 20 weight percent or up to 10 weight percent acrylate. For example, a silica coating dispersion can include at least 1 weight percent, at least 2 weight percent, or at least 5 weight percent acrylate.

In certain embodiments, a surfactant is employed to facilitate contact between the microporous material and a continuous three-dimensional porous network of acid-sintered interconnected silica nanoparticles. Surfactants are molecules having both hydrophilic (polar) and hydrophobic (non-polar) regions and that are capable of reducing the surface tension of a coating dispersion (e.g., aqueous coating formulation). Useful surfactants may include those disclosed, for example, in U.S. Pat. No. 6,040,053 (Scholz et al.). If added, the surfactant is typically present in an amount up to 5 weight percent based on a total weight of a total silica coating dispersion. For example, the amount can be up to 4 weight percent, up to 2 weight percent, or up to 1 weight percent. The surfactant is typically present in an amount equal to at least 0.001 weight percent, at least 0.005 weight percent, at least 0.01 weight percent, at least 0.05 weight percent, at least 0.1 weight percent or at least 0.5 weight percent of a total silica coating dispersion.

Some surfactants for use in silica coating are anionic surfactants. Useful anionic surfactants often have a molecular structure with (1) at least one hydrophobic group such as a $C_6$-$C_{20}$alkyl, alkylaryl, and/or alkenyl groups, (2) at least one anionic group such as sulfate, sulfonate, phosphate, polyoxyethylene sulfate, polyoxyethylene sulfonate, polyoxyethylene phosphate, and the like, and/or the salts of such anionic groups. Suitable salts include alkali metal salts, ammonium salts, tertiary amino salts, and the like. Representative commercial examples of useful anionic surfactants include, but are not limited to, sodium lauryl sulfate (available, for example, under the trade designation TEXAPON L-100 from Henkel Inc. (Wilmington, Del.) and under the trade designation POLYSTEP B-3 from Stepan Chemical Co. (Northfield, Ill.)); sodium lauryl ether sulfate (available, for example, under the trade designation POLYSTEP B-12 from Stepan Chemical Co. (Northfield, Ill.)); ammonium lauryl sulfate (available, for example, under the trade designation STANDAPOL A from Henkel Inc. (Wilmington, Del.)); and sodium dodecyl benzene sulfonate (available, for example, under the trade designation SIPONATE DS-10 from Rhone-Poulenc, Inc. (Cranberry, N.J.)).

Other useful surfactants for use in silica coating dispersions are non-ionic surfactants. Suitable non-ionic surfactants include, but are not limited to, polyethoxylated alkyl alcohols (available, for example, under the trade designations BRIJ 30 and BRIJ 35 from ICI Americas, Inc. (Wilmington, Del.) and under the trade designation TERGITOL TMN-6 from Dow Chemical (Midland, Mich.)); polyethoxylated alkyl phenols (available, for example, under the trade designations TRITON X-100 from Roche (Mannheim, Germany) and ICONOL NP-70 from BASF Corp. (Florham Park, N.J.)); and polyethylene glycol/polypropylene glycol block copolymers (available, for example, under the trade designations TETRONIC 1502, TETRONIC 908, and PLURONIC F38 from BASF Corp. (Florham Park, N.J.)).

In certain embodiments, the microfiltration membranes for use in aspects of the present disclosure include Thermally Induced Phase Separation (TIPS) membranes. The pore size of TIPS membranes can be generally controlled due to the ability to select the extent of stretching of the membrane material. TIPS membranes are relatively inexpensive to make, and methods for making them are known to the skilled practitioner. For example, various membranes and methods are described in detail in U.S. Pat. No. 4,726,989 (Mrozinski), U.S. Pat. No. 5,238,623 (Mrozinski), U.S. Pat. No. 5,993,954 (Radovanovic et al.), and U.S. Pat. No. 6,632,850 (Hughes et al.). Microfiltration membranes for use in aspects of the present disclosure also include Solvent Induced Phase Separated (SIPS) membranes and other microporous membranes made by extrusion, extrusion/stretching and extrusion/stretching/extraction processes, and track etching processes. Suitable microfiltration membranes that may be formed by SIPS include for example and without limitation polyvinylidene fluoride (PVDF), poly(ether sulfone) (PES), polysulfone (PS), polyacrylonitrile (PAN), nylon (i.e., polyamide), cellulose acetate, cellulose nitrate, regenerated cellulose, and polyimide.

In certain embodiments, the microfiltration membrane substrate comprises a thermoplastic polymer, for instance poly(ethersulfone), polyacrylonitrile, polyamide, cellulose acetate, cellulose nitrate, regenerated cellulose, or combinations thereof.

In certain embodiments, the first major surface of the microfiltration membrane substrate comprises an average pore size of at least 50 nanometers (nm), at least 100 nm, at least 250 nm, at least 500 nm, or even at least 750 nm, and up to 2 micrometers (μm), up to 1.5 μm, or even up to 1 μm. Stated another way, in certain embodiments the first major surface of the microfiltration membrane has an average pore size of 50 nm to 2 micrometers, inclusive; 50 nm to 1 μm, inclusive; 100 nm to 1.5 μm, inclusive; or 250 nm to 2 μm, inclusive.

Advantageously, the multilayer article of at least some embodiments of the present disclosure may be used to remove microorganisms from a fluid sample, such as bacteriophages, bacteria, viruses, or a combination thereof. For instance, the multilayer article typically provides a log reduction value of at least 1.0, at least 1.5, at least 2.0, at least 2.5, at least 3.0, at least 3.5, or even at least 4.0 for a fluid containing a bacteriophage that is passed through the multilayer article under a constant flow rate of 0.5 mL/minute at 20-25 degrees Celsius in a stirred cell under a constant pressure of 20 pounds per square inch (psi) (138 kilopascals). Such conditions are described in detail in the Examples below.

According to a second aspect, a method of making a multilayer article is provided. The method includes (a) saturating a microfiltration membrane substrate with a liquid, the microfiltration membrane substrate having a first major surface; (b) applying a first aqueous coating formulation to at least a portion of the first major surface of the microfiltration membrane substrate to form a coated substrate, the first aqueous coating formulation comprising water, a first polymeric binder, a first acid, and a plurality of first silica nanoparticles; (c) sintering the coated substrate, thereby forming a first layer directly attached to the first major surface of the microfiltration membrane substrate, the first layer having a first major surface; (d) applying a second aqueous coating formulation to the first major surface of the first layer to form a twice-coated substrate, the second aqueous coating formulation comprising water, a second acid, and a plurality of second silica nanoparticles; and (e) sintering the twice-coated substrate, thereby forming the multilayer article, the multilayer article comprising a second layer directly attached to the first major surface of the first layer.

Referring to FIG. 3, the method includes (a) saturating a microfiltration membrane substrate with a liquid 310, the microfiltration membrane substrate having a first major surface; (b) applying a first aqueous coating formulation to at least a portion of the first major surface of the microfiltration membrane substrate 320 to form a coated substrate; and (c) sintering the coated substrate 330, thereby forming a first layer directly attached to the first major surface of the microfiltration membrane substrate, the first layer having a first major surface. The first aqueous coating formulation comprises water, a first polymeric binder, a first acid, and a plurality of first silica nanoparticles. The method further includes (d) applying a second aqueous coating formulation to the first major surface of the first layer 340 to form a twice-coated substrate, the second aqueous coating formulation comprising water, a second acid, and a plurality of second silica nanoparticles; and (e) sintering the twice-coated substrate 350, thereby forming the multilayer article, the multilayer article comprising a second layer directly attached to the first major surface of the first layer. The second aqueous coating formulation comprises water, a second acid, and a plurality of second silica nanoparticles.

In many embodiments, the method further comprises removing excess liquid from the first major surface of the microfiltration membrane substrate prior to applying the first aqueous coating formulation. Removing such excess liquid can minimize dilution of the coating formulation upon application to the microfiltration membrane substrate. Often, the liquid is hydrophilic (e.g., containing glycerol, ethylene glycol, and/or water) in order to readily saturate the microfiltration membrane substrate and assist in localizing the aqueous coating formulation at the major surface of the substrate (rather than soaking substantially down into the substrate). In select embodiments, the liquid comprises water or consists essentially of water.

In certain embodiments, the first aqueous coating formulation, the second aqueous coating formulation, or both, comprises at least one alcohol as a co-solvent to assist in stabilizing the silica sol. Suitable alcohols include for instance and without limitation, isopropyl alcohol, ethanol, butanol, ethylene glycol, and glycerol.

Advantageously, it is not necessary to employ high temperatures to dry (e.g., sinter) each aqueous coating formulation on the microfiltration membrane substrate. For instance, the sintering of each of the coated substrate and the twice-coated substrate often occurs at a temperature of no greater than 200 degrees Celsius, no greater than 175 degrees Celsius, no greater than 150 degrees Celsius, no greater than 125 degrees Celsius, or no greater than 100 degrees Celsius.

Typically, the first layer comprises a plurality of acid-sintered interconnected first silica nanoparticles arranged to form a continuous three-dimensional porous network and the second layer comprises a plurality of acid-sintered interconnected second silica nanoparticles arranged to form a continuous three-dimensional porous network. When forming such networks, each of the first aqueous coating formulation and the second aqueous formulation comprises a pH of less than 5, as discussed in detail above. For instance, the first acid and the second acid can be independently selected from nitric acid, phosphoric acid, sulfuric acid, and hydrochloric acid.

EMBODIMENTS

Embodiment 1 is a multilayer article. The multilayer article includes a) a microfiltration membrane substrate, the microfiltration membrane substrate having a first major surface; and b) a first layer having a first major surface and a second major surface disposed opposite the first major surface. The first major surface of the first layer is directly attached to the first major surface of the microfiltration membrane substrate. The first layer comprises a first polymeric binder and a plurality of acid-sintered interconnected first silica nanoparticles arranged to form a continuous three-dimensional porous network. The multilayer article further includes c) a second layer directly attached to the second major surface of the first layer. The second layer comprises a plurality of acid-sintered interconnected second silica nanoparticles arranged to form a continuous three-dimensional porous network.

Embodiment 2 is the multilayer article of embodiment 1, wherein the second layer further comprises a second polymeric binder.

Embodiment 3 is the multilayer article of embodiment 2, wherein the first polymeric binder and the second polymeric binder are the same.

Embodiment 4 is the multilayer article of embodiment 2 or embodiment 3, wherein the first polymeric binder and the second polymeric binder are independently selected from poly(vinyl alcohol) (PVA), a polysaccharide, a urethane resin, and an acrylate resin.

Embodiment 5 is the multilayer article of any of embodiments 1 through 4, wherein the first silica nanoparticles and the second silica nanoparticles comprise the same average particle size diameters.

Embodiment 6 is the multilayer article of any of embodiments 1 through 4, wherein the first silica nanoparticles and the second silica nanoparticles comprise at least some average particle size diameters that are different from each other.

Embodiment 7 is the multilayer article of any of embodiments 1 through 4, wherein the first silica nanoparticles comprise average particle size diameters less than or equal to 250 nanometers (nm).

Embodiment 8 is the multilayer article of any of embodiments 1 through 7, wherein the first silica nanoparticles and the second silica nanoparticles each comprise average particle size diameters of up to 100 nm, inclusive.

Embodiment 9 is the multilayer article of any of embodiments 1 through 7, wherein the first silica nanoparticles and the second silica nanoparticles each comprise average particle size diameters of 110 nm to 250 nm, inclusive.

Embodiment 10 is the multilayer article of any of embodiments 1 through 9, wherein the first silica nanoparticles have a multimodal size distribution.

Embodiment 11 is the multilayer article of any of embodiments 1 through 10, wherein the second silica nanoparticles have a multimodal size distribution.

Embodiment 12 is the multilayer article of any of embodiments 1 through 11, wherein the first silica nanoparticles and the second silica nanoparticles each have a bimodal size distribution.

Embodiment 13 is the multilayer article of any of embodiments 10 through 12, wherein a weight ratio of a first distribution of silica nanoparticles to a second distribution of the first silica nanoparticles in the multimodal size distribution is in a range from 20:80 to 80:20.

Embodiment 14 is the multilayer article of embodiment 13, wherein the first distribution of the first silica nanoparticles comprises average particle size diameters of 100 nm to 250 nm and the second distribution of the first silica nanoparticles comprises average particle size diameters of 1 nm to 90 nm.

Embodiment 15 is the multilayer article of any of embodiments 1 through 14, wherein the first silica nanoparticles, the second silica nanoparticles, or both, comprise fumed silica.

Embodiment 16 is the multilayer article of any of embodiments 1 through 15, wherein the first silica nanoparticles, the second silica nanoparticles, or both, comprise amorphous silica.

Embodiment 17 is the multilayer article of any of embodiments 1 through 16, wherein a weight ratio of the silica nanoparticles to the polymer binder in each of the first layer and the second layer is in a range from 90:10 to 70:30.

Embodiment 18 is the multilayer article of any of embodiments 1 through 17, wherein the microfiltration membrane substrate comprises a Thermally Induced Phase Separation (TIPS) membrane.

Embodiment 19 is the multilayer article of any of embodiments 1 through 18, wherein the microfiltration membrane substrate comprises poly(ether sulfone), polyamide, polyacrylonitrile, cellulose acetate, cellulose nitrate, regenerated cellulose, or combinations thereof.

Embodiment 20 is the multilayer article of any of embodiments 1 through 19, wherein the first major surface of the microfiltration membrane substrate comprises an average pore size of 50 nm to 2 micrometers (μm), inclusive.

Embodiment 21 is the multilayer article of any of embodiments 1 through 20, wherein an average thickness of the first layer and the second layer in combination ranges from 0.5 μm to 10 μm, inclusive.

Embodiment 22 is the multilayer article of any of embodiments 1 through 21, wherein an average thickness of the first layer and the second layer in combination ranges from 0.5 μm to 5 μm, inclusive.

Embodiment 23 is the multilayer article of any of embodiments 1 through 22, wherein an average thickness of the first layer and the second layer in combination ranges from 1.0 μm to 4 μm, inclusive.

Embodiment 24 is the multilayer article of any of embodiments 1 through 23, wherein the multilayer article provides a log reduction value of at least 2.0 for a fluid containing a bacteriophage that is passed through the multilayer article under a constant flow rate of 0.5 mL/minute at 20-25 degrees Celsius in a stirred cell under a constant pressure of 20 pounds per square inch (psi) (138 kilopascals).

Embodiment 25 is the multilayer article of any of embodiments 1 through 24, wherein the multilayer article provides a log reduction value of at least 3.0 for a fluid containing a bacteriophage that is passed through the multilayer article under a constant flow rate of 0.5 mL/minute at 20-25 degrees Celsius in a stirred cell under a constant pressure of 20 psi (138 kilopascals).

Embodiment 26 is the multilayer article of any of embodiments 1 through 25, wherein the multilayer article provides a log reduction value of at least 4.0 for a fluid containing a bacteriophage that is passed through the multilayer article under a constant flow rate of 0.5 mL/minute at 20-25 degrees Celsius in a stirred cell under a constant pressure of 20 psi (138 kilopascals).

Embodiment 27 is a method of making a multilayer article. The method includes (a) saturating a microfiltration membrane substrate with a liquid, the microfiltration membrane substrate having a first major surface; (b) applying a first aqueous coating formulation to at least a portion of the first major surface of the microfiltration membrane substrate to form a coated substrate; and (c) sintering the coated substrate, thereby forming a first layer directly attached to the first major surface of the microfiltration membrane substrate, the first layer having a first major surface. The first aqueous coating formulation comprises water, a first polymeric binder, a first acid, and a plurality of first silica nanoparticles. The method further includes (d) applying a second aqueous coating formulation to the first major surface of the first layer to form a twice-coated substrate, the second aqueous coating formulation comprising water, a second acid, and a plurality of second silica nanoparticles; and (e) sintering the twice-coated substrate, thereby forming the multilayer article, the multilayer article comprising a second layer directly attached to the first major surface of the first layer. The second aqueous coating formulation comprises water, a second acid, and a plurality of second silica nanoparticles.

Embodiment 28 is the method of embodiment 27, further comprising removing excess liquid from the first major surface of the microfiltration membrane substrate prior to applying the first aqueous coating formulation.

Embodiment 29 is the method of embodiment 27 or embodiment 28, wherein the liquid comprises water.

Embodiment 30 is the method of any of embodiments 27 through 29, wherein the liquid consists essentially of water.

Embodiment 31 is the method of any of embodiments 27 through 30, wherein each of the first aqueous coating formulation and the second aqueous formulation comprises a pH of less than 5.

Embodiment 32 is the method of any of embodiments 27 through 31, wherein the first acid and the second acid are independently selected from nitric acid, phosphoric acid, sulfuric acid, and hydrochloric acid.

Embodiment 33 is the method of any of embodiments 27 to 32, wherein the second aqueous coating formulation further comprises a second binder.

Embodiment 34 is the method of embodiment 33, wherein the first polymeric binder and the second polymeric binder are the same.

Embodiment 35 is the method of embodiment 33 or embodiment 34, wherein the first polymeric binder and the second polymeric binder are independently selected from poly(vinyl alcohol) (PVA), a polysaccharide, a urethane resin, and an acrylate resin.

Embodiment 36 is the method of any of embodiments 27 through 35, wherein each of the first aqueous coating formulation and the second aqueous coating formulation comprises an alcohol.

Embodiment 37 is the method of embodiment 36, wherein the alcohol is selected from isopropyl alcohol, ethanol, butanol, ethylene glycol, and glycerol.

Embodiment 38 is the method of any of embodiments 27 through 37, wherein the sintering of each of the coated substrate and the twice-coated substrate occurs at a temperature of no greater than 150 degrees Celsius.

Embodiment 39 is the method of any of embodiments 27 through 38, wherein the first layer comprises a plurality of acid-sintered interconnected first silica nanoparticles arranged to form a continuous three-dimensional porous network.

Embodiment 40 is the method of any of embodiments 27 through 39, wherein the second layer comprises a plurality of acid-sintered interconnected second silica nanoparticles arranged to form a continuous three-dimensional porous network.

Embodiment 41 is the method of any of embodiments 27 through 40, wherein the first silica nanoparticles and the second silica nanoparticles comprise the same average particle size diameters.

Embodiment 42 is the method of any of embodiments 27 through 40, wherein the first silica nanoparticles and the second silica nanoparticles comprise at least some average particle size diameters that are different from each other.

Embodiment 43 is the method of any of embodiments 27 through 40, wherein the first silica nanoparticles comprise average particle size diameters less than or equal to 250 nanometers (nm).

Embodiment 44 is the method of any of embodiments 27 through 43, wherein the first silica nanoparticles and the second silica nanoparticles each comprise average particle size diameters of up to 100 nm, inclusive.

Embodiment 45 is the method of any of embodiments 27 through 43, wherein the first silica nanoparticles and the second silica nanoparticles each comprise average particle size diameters of 110 nm to 250 nm, inclusive.

Embodiment 46 is the method of any of embodiments 27 through 45, wherein the first silica nanoparticles have a multimodal size distribution.

Embodiment 47 is the method of any of embodiments 27 through 46, wherein the second silica nanoparticles have a multimodal size distribution.

Embodiment 48 is the method of any of embodiments 27 through 47, wherein the first silica nanoparticles and the second silica nanoparticles each have a bimodal size distribution.

Embodiment 49 is the method of any of embodiments 46 through 48, wherein a weight ratio of a first distribution of silica nanoparticles to a second distribution of the first silica nanoparticles in the multimodal size distribution is in a range from 20:80 to 80:20.

Embodiment 50 is the method of embodiment 49, wherein the first distribution of silica nanoparticles comprises average particle size diameters of 100 nm to 250 nm and the second distribution of the first silica nanoparticles comprises average particle size diameters of 1 nm to 90 nm.

Embodiment 51 is the method of any of embodiments 27 through 50, wherein the first silica nanoparticles, the second silica nanoparticles, or both, comprise fumed silica.

Embodiment 52 is the method of any of embodiments 27 through 51, wherein the first silica nanoparticles, the second silica nanoparticles, or both, comprise amorphous silica.

Embodiment 53 is the method of any of embodiments 27 through 52, wherein a weight ratio of the silica nanoparticles to the polymer binder in each of the first layer and the second layer is in a range from 90:10 to 70:30.

Embodiment 54 is the method of any of embodiments 27 through 53, wherein the microfiltration membrane substrate comprises a Thermally Induced Phase Separation (TIPS) membrane.

Embodiment 55 is the method of any of embodiments 27 through 54, wherein the microfiltration membrane substrate comprises poly(ether sulfone), polyamide, polyacrylonitrile, cellulose acetate, cellulose nitrate, regenerated cellulose, or combinations thereof.

Embodiment 56 is the method of any of embodiments 27 through 55, wherein the first major surface of the microfiltration membrane substrate comprises an average pore size of 50 nm to 2 micrometers (μm), inclusive.

Embodiment 57 is the method of any of embodiments 27 through 56, wherein an average thickness of the first layer and the second layer in combination ranges from 0.5 μm to 10 μm, inclusive.

Embodiment 58 is the method of any of embodiments 27 through 57, wherein an average thickness of the first layer and the second layer in combination ranges from 0.5 μm to 5 μm, inclusive.

Embodiment 59 is the method of any of embodiments 27 through 58, wherein an average thickness of the first layer and the second layer in combination ranges from 1.0 μm to 4 μm, inclusive.

EXAMPLES

Materials

| Material | Description |
| --- | --- |
| NALCO 2327 | Colloidal silica obtained from Nalco Company, Naperville, IL, under trade designation "NALCO 2327" |
| NALCO 2329 | Colloidal silica obtained from Nalco Company, Naperville, IL, under trade designation "NALCO 2329" |
| CAB-O-SPERSE 2020K | Fumed silica obtained from Cabot Corp., Boston, MA, under trade designation "CAB-O-SPERSE 2020K" |
| CAB-O-SPERSE 4012K | Fumed silica obtained from Cabot Corp., Boston, MA, under trade designation "CAB-O-SPERSE 4012K" |
| PVA | Polyvinyl alcohol, 98-99 mol %, viscosity 58-68 cps was obtained from Marubeni Specialty Chemicals, Inc., White Plains, NY. PVA was first dissolved in deionized (DI) water to prepare 12.5 wt. % aqueous solution before use. |
| KURARAY R235 PVA | Polyvinyl alcohol was obtained from Kuraray America Inc., Houston, TX. PVA was first dissolved in deionized (DI) water to prepare 6.75 wt. % aqueous solution before use |
| IPA | Isopropyl alcohol, obtained from VWR International, West Chester, PA |
| Nitric acid | 68-70 wt. %, obtained from VWR International, West Chester, PA |
| Phi X174 bacteriophage | ATCC 13706, obtained from American Type Culture Collection, Manassas, VA |
| ATCC 13706 *Escherichia coli* | Obtained from American Type Culture Collection, Manassas, VA |
| MS2 bacteriophage | ATCC 15597, obtained from American Type Culture Collection, Manassas, VA |
| ATCC 15597 *Escherichia coli* | Obtained from American Type Culture Collection, Manassas, VA |
| Immunoglobulin (IgG) | Obtained from Sigma Aldrich Chemical Company, St. Louis, MO |
| Phosphate buffer | Obtained from Sigma Aldrich Chemical Company, St. Louis, MO |
| Au nanoparticles | Gold nanoparticles, 7 nm and 20 nm, concentrations of 0.005 mg/mL, obtained from nonoComposix, Inc., San Diego, CA |
| PES | Microporous poly(ether sulfone) membrane, 111 μm thick, obtained from 3M Purification., Inc., St. Paul, MN, under trade designation "MICRO PES" |
| Nylon | Microporous nylon membrane, 0.45 μm pore size, Lot#15D05301, obtained from 3M Purification., Inc., St. Paul, MN |

Reagents and solvents not listed in Table above were obtained from standard chemical suppliers such as Sigma Aldrich (St Louis, Mo.) and were used as received.

Test Methods

The flux of coated PES membranes prepared as described in Examples below were measured inside a stirred cell (obtained from EMD Millipore, Billerica, Mass. under trade designation "AMICON") under constant pressure. The stir bar that came with the stirred cell was not used during flux measurements. The 25 mm stirred cell (catalog number: 5121) had a maximum working volume of 10 mL and an effective membrane area of 4.1 cm$^2$. The 44.5 mm stirred cell (catalog number: UFSC05001) had a maximum working volume of 50 mL and an effective membrane area of 13.4 cm$^2$.

The Immunoglobulin (IgG) binding test was performed on AKTA AVANT 25 (obtained from GE Healthcare BioSciences, Pittsburgh, Pa.).

The MS2 clearance test was performed using disks ($\Phi$=47 mm) punched from coated PES membranes under constant pressure using a pressure vessel. Three disks were measured for each sample. The concentration of MS2 in both influent and effluent samples was determined by a standard plaque count method utilizing the bacteriophage host E. coli (ATCC 15597), tryptic soy agar bottom agar and tryptic soy broth with 0.3% agar as top agar. The plates were incubated at 37° C. for 18-24 hours prior to enumeration.

The Phi X174 clearance test was performed on disks ($\Phi$=47 mm) punched from coated PES membranes at a constant flow rate of 0.5 or 1.0 mL/min using a peristaltic pump. The concentration of Phi X174 in both influent and effluent samples was determined by a standard plaque count method utilizing the bacteriophage host E. coli (ATCC 13706), nutrient broth bottom agar and nutrient broth with 0.5% agar as top agar. The plates were incubated at 37° C. overnight prior to enumeration.

The log reduction values (LRV) were calculated using the following equation:

$$LRV = \log_{10}\left(\frac{A}{B}\right)$$

Where:
A=Total number of bacteriophage in the challenge solution (influent)
B=Total number of bacteriophage in the filtrate (effluent)
SEM images were taken using JEOL JSM-6010LA (obtained from JEOL USA, Peabody, Mass.) and Hitachi SU-8230 Field Emission scanning electron microscope (obtained from Hitachi, Ltd., Tokyo, Japan).

ICP atomic emission spectroscopy was performed on Perkin Elmer Optima 8300 ICP optical emission spectrophotometer (obtained from Perkin Elmer, Inc., Waltham, Mass.) and the detection limit of SiO$_2$ is 0.0007 µg/mL. Results were corrected for impurities in the acid blanks. Samples were digested with 50% hydrofluoric acid. The standards contain 0, 0.2, 0.5, and 1 µg/mL of silicon.

Example 1

Figure 4A:
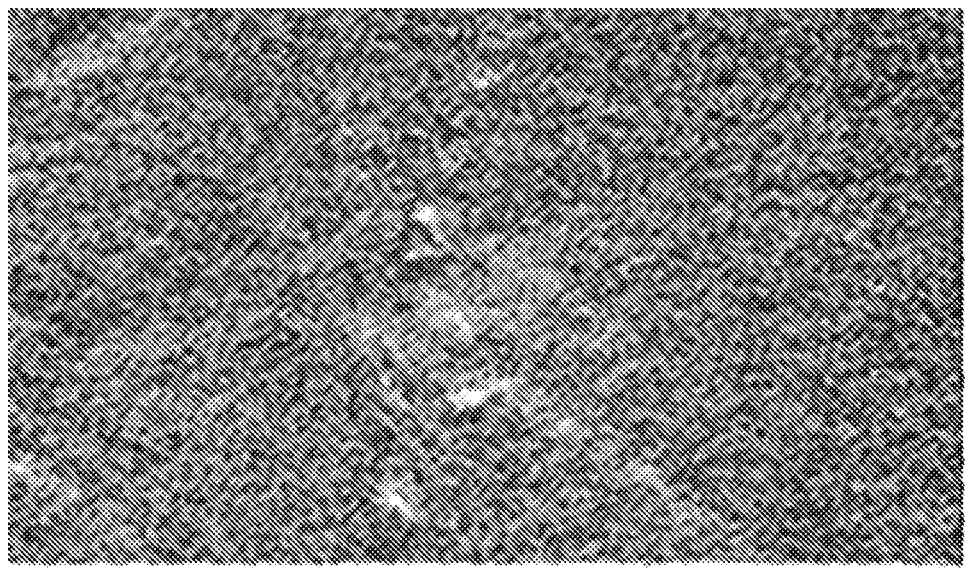
FIG. 4A is a scanning electron micrograph of a top view of the Example 1 single-layer article.
Figure 4B:
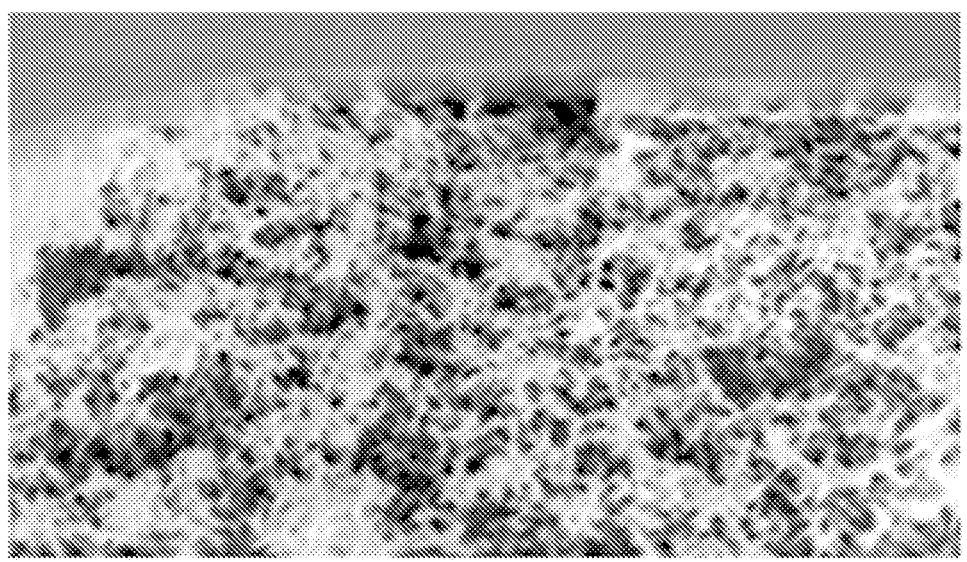
FIG. 4B is a scanning electron micrograph of a cross-sectional view of the Example 1 single-layer article.

A microporous PES membrane was first saturated with deionized (DI) water, and the excess water on the surface was removed using a paper towel. The microporous PES membrane was then hand coated with the coating formulation using a Mayer bar (#3). The coating formulation was prepared by mixing CAB-O-SPERSE 2020K (5.0 g), PVA (5.0 g, 12.5 wt. % in DI water), DI water (2.0 g) and IPA (0.5 g), and adjusting the pH to 2-3 using nitric acid. The coated PES membrane was dried in an oven set at 90° C. for 15 minutes. A coating with a defect-free morphology that stayed on the PES membrane was obtained. FIGS. 4A and 4B are the SEM images of Example 1 coatings.

The rejection of Phi X 174 (bacteriophage) was obtained by passing a concentrated Phi X 174 solution (10$^7$ PFU/mL) in physiological phosphate buffer through a disk of the coated PES membrane ($\Phi$=25 mm) in a stirred cell (25 mm) under a constant pressure of 20 psi (137.9 kPa). The log reduction value (LRV) was determined to be 1.93 (one measurement). The flux value was determined by flowing DI water through a disk of the coated PES membrane ($\Phi$=44 mm) inside a stirred cell (44.5 mm) under a constant pressure of 20 psi (137.9 kPa). The average flux of three measurements on the same disk was 249±5 LMH/Bar.

Example 2

Example 2 samples were prepared in the same manner as Example 1 except that the coating formulation was prepared by mixing CAB-O-SPERSE 2020K (4.0 g), NALCO 2327 (2.0 g), PVA (5.0 g, 12.5 wt. % in DI water), DI water (2.0 g) and IPA (0.5 g), and adjusting the pH to 2-3 using nitric acid. 7 nm and 20 nm Au nanoparticles (both diluted to 0.025 mg/mL using Milli-Q water) were used as a challenge to test the rejection by the nanoparticle coating of Example 2. Disks of 25 mm in diameter were punched from the coated PES membrane, and an Au nanoparticle solution was flowed through the disk in a stirred cell (25 mm) under constant pressure. Both the challenge solution and effluent were analyzed by UV-Vis spectroscopy and the absorbance value at 550 nm was used to quantify the Au nanoparticle concentration (Note: the accuracy of results is limited by the detection limit of UV-Vis.). 93% of the 7 nm Au nanoparticles were rejected and 100% of the 20 nm Au nanoparticles were rejected.

Example 3

Example 3 samples were prepared in the same manner as Example 1 except that the coating formulation was prepared by mixing CAB-O-SPERSE 2020K (5.0 g), KURARAY R235 PVA (5.0 g of 6.75 wt. % solution in DI water) and IPA (0.5 g), and adjusting the pH to 2-3 using nitric acid. The coating formulation was hand coated on the wet PES membrane using a Mayer bar (#6). The coated sample was dried and sintered in an oven set at 110° C. for 15 minutes. The average flux across the coated sample (three repeated measurements) was determined to be 477±4 LMH/Bar on a disk ($\Phi$=44 mm) punched from the coated PES membrane by flowing DI water inside a stirred cell (44.5 mm) under a constant pressure of 10 psi (69 kPa). After taking SEM images of the Example 3 sample before and after folding the sample 180 degrees toward the coated side by hand, it was observed that cracks developed on nanoparticle coating; however, no delamination of the nanoparticle coating from the PES membrane was observed.

Example 4

The Example 4 sample was prepared in the same manner as Example 1 except that the coating formulation was prepared by mixing CAB-O-SPERSE 2020K (4.0 g), NALCO 2327 (1.0 g), NALCO 1115 (1.0 g), KURARAY R235 PVA (5.0 g of 6.75 wt. % solution in DI water) and IPA (0.5 g), and adjusting the pH to 2-3 using nitric acid.

To quantify the leaching of SiO$_2$ nanoparticles and organic compounds from the entire nanoparticle coated PES membranes of Example 3 and Example 4, 1 disk per sample ($\Phi$=44 mm) was punched and each was soaked in 45 mL of Milli-Q water at room temperature (e.g., 20-23 degrees C.) for three days. The water bath was analyzed using ICP to determine the concentration of leached SiO$_2$ and Total Organic Carbon (TOC). Milli-Q water (Control 1) and the water bath after soaking a pristine PES membrane (Control 2) were analyzed as negative controls. The results are summarized in Table 1, below.

TABLE 1

| Sample | Mass of Disk (g) | SiO$_2$ Concentration (ppm) | TOC (ppm) |
| --- | --- | --- | --- |
| Control 1 | N/A | 0.007 ± 0.002 | 2.335 |
| Control 2 | 0.053 | 0.015 ± 0.004 | 15.91 |
| Example 3 | 0.055 | 0.052 ± 0.005 | 11.74 |
| Example 4 | 0.055 | 0.119 ± 0.004 | 11.77 |

Examples 5-7

The Example 5 sample was prepared in the same manner as Example 1 except that the coating formulation was prepared by mixing CAB-O-SPERSE 2020K (5.0 g), PVA (5.0 g of 12.5 wt. % solution in DI water), DI Water (2.0 g) and IPA (0.5 g), and adjusting the pH to 2-3 using nitric acid. The coating formulation was hand coated on the wet PES membrane using a Mayer bar (#3). The coated PES membrane was dried in an oven set at 90° C. for 15 minutes.

The Example 6 sample was prepared in the same manner as Example 5 except that a second layer of coating using the same coating formulation was applied after drying the first layer. The coated PES membrane was dried at 90° C. in an oven for 15 minutes. After applying the second layer of coating, the coated PES membrane was again dried in an oven set at 90° C. for 15 minutes.

The Example 7 sample was prepared in the same manner as Example 6 except that the coating formulation used for both layers was diluted by about a factor of two (i.e., the formulation was prepared by mixing CAB-O-SPERSE 2020K (2.5 g), PVA (2.5 g of 12.5 wt. % solution in DI water), DI Water (7.0 g) and IPA (0.5 g), and adjusting the pH to 2-3 using nitric acid).

Figure 5A:
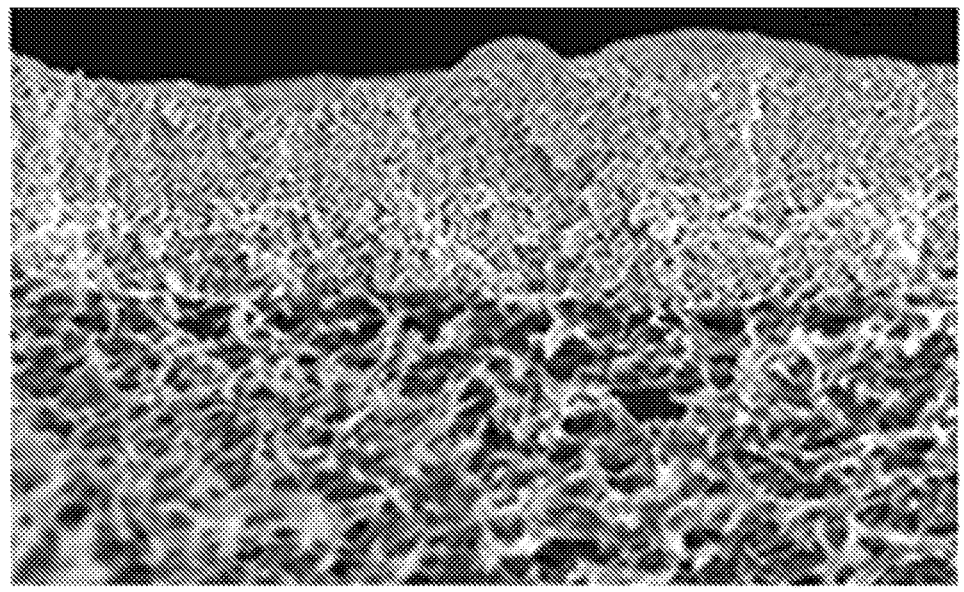
FIG. 5A is a scanning electron micrograph of a cross-sectional view of the Example 6 multilayer article.
Figure 5B:
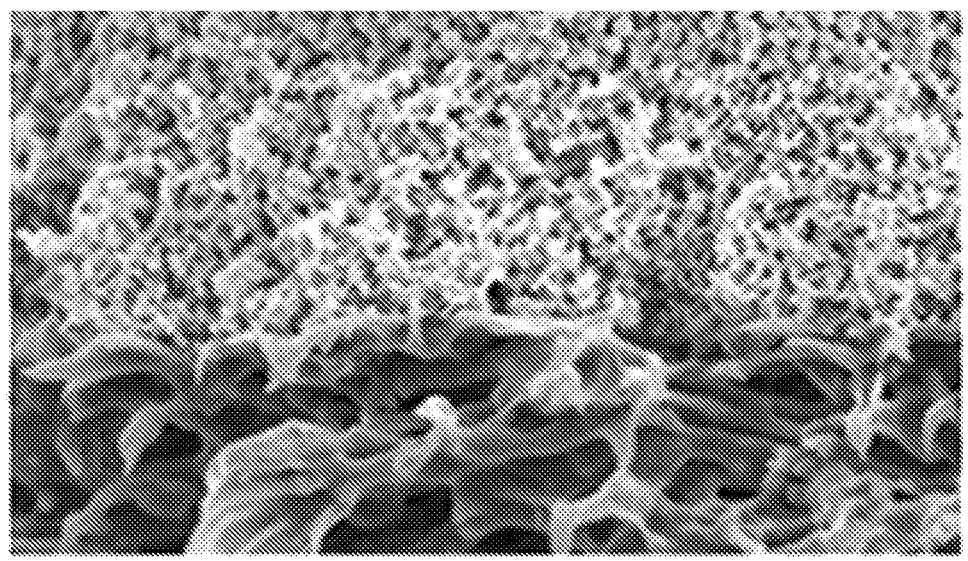
FIG. 5B is a scanning electron micrograph of a cross-sectional view of the Example 6 multilayer article, at a higher resolution than FIG. 5A.

Example 5-7 samples were tested to determine the average flux by flowing DI water through a disk punched from the coated PES membrane (Φ=44 mm) in a stirred cell under constant pressure. An average value was obtained on three repeated measurements. The coating thicknesses were determined using cross-sectional SEM images. FIGS. 5A and 5B are SEM images of the Example 6 sample. The number of coating layers and the performance data for the coated Examples 5-7 samples are summarized in Table 2, below.

TABLE 2

| Example | Number of Coating Layers | Flux (LMH/Bar) | Coating Thickness (µm) |
| --- | --- | --- | --- |
| 5 | 1 | 509 ± 38 | 1.3 |
| 6 | 2 | 44 ± 1 | 2.1 |
| 7 | 2 | 62 ± 7 | 1.5 |

Examples 8-9

The Example 8 sample was prepared in the same manner as Example 1 except that the coating formulation was prepared by mixing CAB-O-SPERSE 2020K (5.0 g), PVA (7.0 g of 12.5 wt. % solution in DI water), DI Water (5.0 g) and IPA (0.5 g), and adjusting the pH to 2-3 using nitric acid. The coating formulation was hand coated on the wet PES membrane using a Mayer bar (#3). The coated PES membrane was dried in an oven set at 90° C. for 15 minutes.

The Example 9 sample was prepared in the same manner as Example 1 except that the coating formulation was prepared by mixing CAB-O-SPERSE 2020K (2.5 g), PVA (2.5 g of 12.5 wt. % solution in DI water), DI Water (7.0 g) and IPA (0.5 g), and adjusting the pH to 2-3 using nitric acid. The coating formulation was hand coated on the wet PES membrane using a Mayer bar (#3). The coated PES membrane was dried in an oven set at 90° C. for 15 minutes. Then, a second layer of coating using the same coating formulation was applied (after drying the first layer). After applying the second layer of coating, the coated PES membrane was again dried in an oven set at 90° C. for 15 minutes.

Example 8 and 9 samples prepared above were tested to determine the average flux and average LRV. An uncoated microporous PES membrane was also tested as a control. The number of coating layers and the performance data for the coated Examples 8-9 samples are summarized in Table 3, below.

TABLE 3

| Example | Number of Coating Layers | Flux (LMH/Bar) | Average LRV |
| --- | --- | --- | --- |
| 8 | 1 | 517 ± 161 | 0.1 |
| 9 | 2 | 120 ± 101 | 1.8 |
| Control (uncoated PES membrane) | None | 2590 ± 344 | 0.3 |

Example 10

The Example 10 sample was prepared by hand coating a microporous PES membrane with a coating formulation using a Mayer bar (#3). The coating formulation was prepared by mixing CAB-O-SPERSE 2020K (5.0 g), PVA (7.0 g, 12.5 wt. % in DI water), DI water (5.0 g) and IPA (0.5 g), and adjusting the pH to 2-3 using nitric acid. The coated PES membrane was dried in an oven set at 90° C. for 15 minutes. After drying the coated PES membrane was coated with a second coating formulation which was prepared by mixing CAB-O-SPERSE 1020K (5.0 g), PVA (5.0 g, 12.5 wt. % in DI water), DI water (3.0 g) and IPA (0.5 g), and adjusting the pH to 2-3 using nitric acid, and drying at 90° C. in an oven for 15 minutes. A flux of 40±2 LMH/Bar was measured by flowing water through a disk (Φ=44 mm) in a stirred cell under a constant pressure of 20 psi (137.9 kPa).

Immunoglobulin (IgG) was selected to test the specific binding of the nanoparticle coating with protein molecules. IgG in physiological phosphate buffer (1 mg/mL) was used as a challenge to flow through the Example 10 coated PES membrane under a constant flow rate of 1 mL/min. The total volume of IgG solution used in this test was 10 mL. The IgG solution was also flowed through an empty sample holder under the same conditions. The absorbance at 280 nm was monitored by UV-Vis spectroscopy to indicate the IgG concentration in both cases. There was little difference in absorption between flowing the IgG solution between the empty sample holder versus the coated PES membrane (e.g., about 265 milli absorbance units (mAU) maximum absorption versus 255 mAU maximum absorption, respectively).

Examples 11-17

Example 11-17 samples were prepared by coating microporous PES membranes with single or double-layer coatings using various combinations of coating formulations summarized in Table 4, below. To form the coatings, first of all, the PES membrane was wet with Milli-Q water and the excess water on the surface was removed using a paper towel. For articles having two coating layers, the first coating formulation was hand-coated on the PES membrane using a Mayer Bar #3 followed by drying and sintering the first coating in an oven set at 90° C. for 15 minutes. Then, the prepared coated PES membrane from the above step was coated with the second coating formulation using a Mayer Bar #3 followed by drying and sintering the second coating in an oven set at 90° C. for 15 minutes. If only a single-layer coating was desired, the coating formulation was applied on the PES membrane using a Mayer Bar #6. The number of coating layers and the formulations used for the coated Examples 11-17 PES membranes are summarized in Table 5, below.

Example 11-17 samples were tested to determine the LRV Values (using Phi X174 bacteriophage) under a constant flow rate of 0.5 mL/min using a peristaltic pump. The average flux was measured using a stirred cell under constant pressure as summarized in Table 5, below. The coating thicknesses were determined using cross-sectional SEM images.

Examples 18-19

Example 18-19 samples were prepared by coating microporous Nylon substrates with single or double-layer coatings, respectively, using a coating formulation prepared by mixing CAB-O-SPERSE 4012K (6.0 g), NALCO 2327 (0.5 g), PVA (2.6 g, 12.5 wt. % in Milli-Q water) and IPA (0.5 g), and adjusting the pH to 2-3 using nitric acid. The silica nanoparticle suspensions were purified by cation exchange resin (AMBERLITE IRN-77) before mixing with other components.

The single or double layer coating process for Examples 18-19 was the same as described above for Examples 11-17, except that Mayer Bar #6 was used for each layer of double-layer coatings and Mayer Bar #12 was used for single-layer coatings.

Example 18-19 samples were tested to determine the LRV Values (using Phi X174 bacteriophage) and average flux. The coating thickness were determined using cross-sectional SEM images. The number of coating layers and the performance data for the coated Examples 16-17 samples are summarized in Table 6, below.

TABLE 4

| Coating Formulation | Silica | | PVA (12.5 wt. % Solution in water, g) | Water (g) | IPA (g) | pH |
|---|---|---|---|---|---|---|
| | Type | Amount (g) | | | | |
| 1 | CAB-O-SPERSE 4012K | 6.0 | 2.6 | 0 | 0.5 | 2~3 |
| | NALCO 2327 | 0.5 | | | | |
| 2 | NALCO 2329 | 3.0 | 3.2 | 5.0 | 0.5 | 2~3 |
| 3 | CAB-O-SPERSE 4012K | 6.0 | 0 | 2.6 | 0.5 | 2~3 |
| | NALCO 2327 | 0.5 | | | | |
| 4 | None | 0 | 2.6 | 6.5 | 0.5 | 2~3 |

TABLE 5

| Example | No. of Layers | Coating Formulation 1st Layer | Coating Formulation 2nd Layer | LRV | Average Flux (LMH/Bar) | Thickness (μm) |
|---|---|---|---|---|---|---|
| 11 | 2 | 1 | 1 | 4.20 | 14.0 ± 0.2 @ 186.2 kPa | 3.0 |
| 12 | 1 | 1 | None | 0.24 | 163.0 ± 0.9 @ 62 kPa | 1.6 |
| 13 | 2 | 2 | 2 | 2.38 | 6.6 ± 0.5 @ 206.8 kPa | 1.2 |
| 14 | 1 | 2 | None | 0.54 | 191.0 ± 28.0 @ 206.8 kPa | 0.9 |
| 15 | 2 | 1 | 2 | 1.73 | 9.0 ± 0.1 @ 48.3 kPa | 1.9 |
| 16 | 2 | 1 | 3 | 2.05 | 131.0 ± 2.4 @ 82.7 kPa | 1.9 |
| 17 | 2 | 1 | 4 | 1.22 | 4.9 ± 0.1 @ 262 kPa | 0.4 |

Transmission electron microscopy was used to examine the cross-sections of Examples 11 and 12. The coated PES membranes were infiltrated with 3M SCOTCHCAST #5 Electrical Resin and cured at room temperature. The cured samples were then sliced using a microtome and the cross-sections of the coated PES membranes were measured. FIGS. 6A and 6B show a STEM bright field image and a corresponding STEM high angle annular dark field image, respectively, of the Example 11 sample. The interface of the two coating layers is highlighted by dotted lines. FIGS. 6C and 6D show a STEM bright field image and a corresponding STEM high angle annular dark field image, respectively, of the Example 12 sample.

TABLE 6

| Example | Number of Layers | LRV | Average Flux (LMH/Bar) | Thickness (μm) |
|---|---|---|---|---|
| 18 | 1 | 1.32 | 40.1 ± 1.4 | 2.7 |
| 19 | 2 | 3.58 | 5.5 ± 0.0 | 4.7 |

Examples 20-21

Example 20-21 samples were prepared in the same manner as Examples 18-19, respectively, by coating microporous PES substrates with single or double-layer coatings, respectively, using a coating formulation prepared by mixing CAB-O-SPERSE 4012K (6.0 g), NALCO 2327 (0.5 g), hydroxyethyl cellulose (2.6 g, 12.5 wt. % in Milli-Q water), Milli-Q water (4.8 g) and IPA (0.5 g), and adjusting the pH to 2-3 using nitric acid. The silica nanoparticle suspensions were purified by cation exchange resin (AMBERLITE IRN-77) before mixing with other components.

Example 20-21 samples were tested to determine the LRV Values (using Phi X174 bacteriophage) and average flux. The number of coating layers and the performance data for the coated Examples 20-21 samples are summarized in Table 7, below.

TABLE 7

| Example | Number of Layers | LRV | Average Flux (LMH/Bar) |
|---------|------------------|------|------------------------|
| 20 | 1 | 0.16 | 676 ± 31 |
| 21 | 2 | 0.38 | 1600 ± 73 |

What is claimed is:

1. A multilayer article comprising:
   a) a microfiltration membrane substrate, the microfiltration membrane substrate having a first major surface;
   b) a first layer having a first major surface and a second major surface disposed opposite the first major surface, wherein the first major surface of the first layer is directly attached to the first major surface of the microfiltration membrane substrate, the first layer comprising a first polymeric binder and a plurality of acid-sintered interconnected first silica nanoparticles arranged to form a continuous three-dimensional porous network; and
   c) a second layer directly attached to the second major surface of the first layer, the second layer comprising a plurality of acid-sintered interconnected second silica nanoparticles arranged to form a continuous three-dimensional porous network.

2. The multilayer article of claim 1, wherein the second layer further comprises a second polymeric binder.

3. The multilayer article of claim 2, wherein the first polymeric binder and the second polymeric binder are independently selected from poly(vinyl alcohol) (PVA), a polysaccharide, a urethane resin, and an acrylate resin.

4. The multilayer article of claim 1, wherein the first silica nanoparticles and the second silica nanoparticles comprise at least some average particle size diameters that are different from each other.

5. The multilayer article of claim 1, through wherein the first silica nanoparticles comprise average particle size diameters less than or equal to 250 nanometers (nm).

6. The multilayer article of claim 1, wherein the first silica nanoparticles have a multimodal size distribution.

7. The multilayer article of claim 1, wherein the microfiltration membrane substrate comprises poly(ether sulfone), polyamide, polyacrylonitrile, cellulose acetate, cellulose nitrate, regenerated cellulose, or combinations thereof.

8. The multilayer article of claim 1, wherein an average thickness of the first layer and the second layer in combination ranges from 0.5 μm to 10 μm, inclusive.

9. The multilayer article of claim 1, wherein the multilayer article provides a log reduction value of at least 2.0 for a fluid containing a bacteriophage that is passed through the multilayer article under a constant flow rate of 0.5 mL/minute at 20-25 degrees Celsius in a stirred cell under a constant pressure of 20 pounds per square inch (psi) (138 kilopascals).

10. A method of making a multilayer article comprising:
   (a) saturating a microfiltration membrane substrate with a liquid, the microfiltration membrane substrate having a first major surface;
   (b) applying a first aqueous coating formulation to at least a portion of the first major surface of the microfiltration membrane substrate to form a coated substrate, the first aqueous coating formulation comprising water, a first polymeric binder, a first acid, and a plurality of first silica nanoparticles;
   (c) sintering the coated substrate, thereby forming a first layer directly attached to the first major surface of the microfiltration membrane substrate, the first layer having a first major surface;
   (d) applying a second aqueous coating formulation to the first major surface of the first layer to form a twice-coated substrate, the second aqueous coating formulation comprising water, a second acid, and a plurality of second silica nanoparticles; and
   (e) sintering the twice-coated substrate, thereby forming the multilayer article, the multilayer article comprising a second layer directly attached to the first major surface of the first layer.

11. The method of claim 10, further comprising removing excess liquid from the first major surface of the microfiltration membrane substrate prior to applying the first aqueous coating formulation.

12. The method of claim 10, wherein the liquid consists essentially of water.

13. The method of claim 10, wherein each of the first aqueous coating formulation and the second aqueous formulation comprises a pH of less than 5.

14. The method of claim 10, wherein the second coating formulation further comprises a second binder.

15. The method of claim 10, wherein each of the first aqueous coating formulation and the second aqueous coating formulation comprises an alcohol selected from isopropyl alcohol, ethanol, butanol, ethylene glycol, and glycerol.

16. The method of claim 10, wherein the sintering of each of the coated substrate and the twice-coated substrate occurs at a temperature of no greater than 150 degrees Celsius.

* * * * *

UNITED STATES PATENT AND TRADEMARK OFFICE
CERTIFICATE OF CORRECTION

PATENT NO. : 10,814,287 B2
APPLICATION NO. : 16/097854
DATED : October 27, 2020
INVENTOR(S) : Chunjie Zhang et al.

It is certified that error appears in the above-identified patent and that said Letters Patent is hereby corrected as shown below:

In the Claims

Column 27,
Line 47, in Claim 5, after "claim 1," delete "through".

Signed and Sealed this
Fifteenth Day of December, 2020

Andrei Iancu
*Director of the United States Patent and Trademark Office*